United States Patent
Bovino

(10) Patent No.: US 9,722,784 B2
(45) Date of Patent: Aug. 1, 2017

(54) QUANTUM CRYPTOGRAPHIC KEY DISTRIBUTION SYSTEM INCLUDING TWO PERIPHERAL DEVICES AND AN OPTICAL SOURCE

(71) Applicant: SELEX ES S.p.A., Rome (IT)

(72) Inventor: Fabio Antonio Bovino, Rome (IT)

(73) Assignee: SELEX ES S.p.A., Rome (IT)

( * ) Notice: Subject to any disclaimer, the term of this patent is extended or adjusted under 35 U.S.C. 154(b) by 66 days.

(21) Appl. No.: 14/763,395

(22) PCT Filed: Jan. 24, 2014

(86) PCT No.: PCT/IB2014/058532
§ 371 (c)(1),
(2) Date: Jul. 24, 2015

(87) PCT Pub. No.: WO2014/115118
PCT Pub. Date: Jul. 31, 2014

(65) Prior Publication Data
US 2015/0365230 A1    Dec. 17, 2015

(30) Foreign Application Priority Data

Jan. 25, 2013 (EP) .................................... 13425014

(51) Int. Cl.
*H04L 9/08* (2006.01)
(52) U.S. Cl.
CPC .......... *H04L 9/0852* (2013.01); *H04L 9/0825* (2013.01); *H04L 9/0827* (2013.01)

(58) Field of Classification Search
CPC .... H04L 9/0852; H04L 9/0827; H04L 9/0825
See application file for complete search history.

(56) References Cited

U.S. PATENT DOCUMENTS

2006/0222180 A1* 10/2006 Elliott ................... H04L 9/0852
380/263

OTHER PUBLICATIONS

Fabio A Bovino et al, "Practical Quantum Cryptography: the Q-KeyMaker", Apr. 13, 2011(Apr. 13, 2011), XP055126994, URL: http //arxiv.org/abs/1104.2475[retrieved on Jul. 3, 2014].

(Continued)

*Primary Examiner* — Brandon Hoffman
*Assistant Examiner* — Nega Woldemariam
(74) *Attorney, Agent, or Firm* — Vector IP Law Group; Robert S. Babayi

(57) ABSTRACT

A quantum cryptographic key distribution system, including: an optical source, which generates a plurality of optical pulses; an optical beam splitter, which generates, starting from each optical pulse, a first and a second optical sub-pulse; a first and a second peripheral device; and an optical path having a first and a second end connected to the optical beam splitter, the optical path extending through the first and second peripheral devices and being traversed in opposite directions by the first and second optical sub-pulses. The peripheral device randomly phase shifts the second optical sub-pulse by a first phase, and the second peripheral device randomly phase shifts the first optical sub-pulse by a second phase. Furthermore, the optical path is such as to cause interference in the first optical beam splitter between the first and second optical sub-pulses, as a function of first and second phases.

18 Claims, 10 Drawing Sheets

(56) References Cited

OTHER PUBLICATIONS

F A Bavino et al, "Quantum Correlation Bounds for Quantum Information Experiments Optimization: the Wigner Inequality Case" In: "Quantum Correlation Experiments Optimization: the Wigner Inequality Case", Feb. 15, 2008 (Feb. 15, 2008), XP055126998.
Patent Cooperation Treaty International Search Report, PCT/IB2014/058532, Jul. 15, 2014.
Response and Amendment filed on Apr. 21, 2015 in PCT Application No. PCT/IB2014/058532.
Response and Amendment filed on May 15, 2015 in PCT Application No. PCT/IB2014/058532.

* cited by examiner

FIG. 3

| Rectilinear basis | | | | | | | Diagonal basis | | | | | | |
|---|---|---|---|---|---|---|---|---|---|---|---|---|---|
| Polarization states | | BSA output | | | | | Polarization states | | BSA output | | | | |
| | | Single photons | | WCP | | | | | Single photons | | WCP | | |
| A | B | $\|\psi^+\rangle$ | $\|\psi^-\rangle$ | $\|\psi^+\rangle$ | $\|\psi^-\rangle$ | | A | B | $\|\psi^+\rangle$ | $\|\psi^-\rangle$ | $\|\psi^+\rangle$ | $\|\psi^-\rangle$ | |
| $\|H\rangle$ | $\|H\rangle$ | 0 | 0 | 0 | 0 | | $\|+45\rangle$ | $\|+45\rangle$ | 1 | 0 | 0.75 | 0.25 | |
| $\|V\rangle$ | $\|V\rangle$ | 0 | 0 | 0 | 0 | | $\|-45\rangle$ | $\|-45\rangle$ | 1 | 0 | 0.75 | 0.25 | |
| $\|H\rangle$ | $\|V\rangle$ | 0.5 | 0.5 | 0.5 | 0.5 | | $\|+45\rangle$ | $\|-45\rangle$ | 0 | 1 | 0.25 | 0.75 | |
| $\|V\rangle$ | $\|H\rangle$ | 0.5 | 0.5 | 0.5 | 0.5 | | $\|-45\rangle$ | $\|+45\rangle$ | 0 | 1 | 0.25 | 0.75 | |

FIG. 7

| $\varphi_A$ | $\varphi_B$ | SPCM that detects a signal | Flip bit | Key bit |
|---|---|---|---|---|
| 0 | 0 | 2 | no | 0 |
| 0 | $\pi$ | 1 | yes | 1 |
| $\pi$ | 0 | 1 | yes | 1 |
| $\pi$ | $\pi$ | 2 | no | 0 |
| $\pi/2$ | $\pi/2$ | 2 | no | 0 |
| $\pi/2$ | $3\pi/2$ | 1 | yes | 1 |
| $3\pi/2$ | $\pi/2$ | 1 | yes | 1 |
| $3\pi/2$ | $3\pi/2$ | 2 | no | 0 |

QUANTUM CRYPTOGRAPHIC KEY DISTRIBUTION SYSTEM INCLUDING TWO PERIPHERAL DEVICES AND AN OPTICAL SOURCE

TECHNICAL FIELD

The present invention relates to a quantum cryptographic key distribution system that includes two peripheral devices and an optical source.

BACKGROUND ART

As is known, numerous quantum key distribution (QKD) protocols are available today that guarantee particularly high levels of security at the theoretical level.

For example the so-called BB84 protocol is known, which was described for the first time by C. H. Bennett and G. Brassard in "*Quantum cryptography: Public key distribution and coin tossing*", Proc. of the IEEE Int. Conf. on Computers, Systems & Signal Processing, Bangalore, India, Dec. 10-12, 1984, pp. 175-179.

Another example of a quantum key distribution system is shown in FIG. 1; in particular, FIG. 1 shows a quantum key distribution system (indicated by reference numeral 1) of the measurement device independent type (measurement device independent quantum key distribution—MDI-QKD), which for brevity shall be referred to hereinafter as the distribution system 1.

The distribution system 1 includes a first, a second and a third communications device A, B and C.

The first communications device A comprises a first optical source 2, a first polarization modulator 4, a first variable optical attenuator (VOA) 6 and a first polarization state generator 8.

In use, the first optical source 2 generates a plurality of optical pulses, also referred to as first-source pulses, which are received by the first polarization modulator 4, Which in turn is controlled by the first polarization state generator 8. In practice, each first-source-pulse output from the first polarization modulator 4 has a polarization state that depends on the first polarization modulator 4; furthermore, each first-source pulse is then attenuated in a controllable manner by the first variable optical attenuator 6.

The second communications device B comprises a second optical source 12, a second polarization modulator 14, a second variable optical attenuator (VOA) 16 and a second polarization state generator 18.

In use, the second optical source 12 generates a plurality of optical pulses, also referred to as second-source pulses, which are received by the second polarization modulator 14, which in turn is controlled by the second polarization state generator 18. In practice, each second-source pulse output from the second polarization modulator 14 has a polarization state that depends on the second polarization modulator 14; furthermore, each second-source pulse is then attenuated in a controllable manner by the second variable optical attenuator 16.

The first and second source pulses output from the first and second variable optical attenuators 6 and 16, are received by the third communications device C. To that end, the first and second communications devices A and B are optically connected to the third communications device C by, respectively, a first and a second communications channel 20 and 22, also known as quantum channels. Furthermore, a public channel 30 is present between the first, second and third communications devices A, B and C.

The first and second source pulses are weak coherent pulses (WCP) and are respectively generated by the, first and second optical sources 2 and 12, which are formed by corresponding laser diodes.

In greater detail, the first and second polarization state generators 8 and 18 operate randomly and therefore the first and second source pulses are randomly polarization encoded. More in particular, each of the first and second polarization state generators 8 and 18 randomly switches between a first and a second system of polarization bases of the Hilbert space, generally known as the system of rectilinear bases (for brevity, also known as the rectilinear basis) and the system of diagonal bases (for brevity, also known as the diagonal basis). The system of rectilinear bases is formed by the vertical polarization state $|V\rangle$ (also known as the vertical basis) and the horizontal polarization state $|H\rangle$ (also known as the horizontal basis), while the system of diagonal bases is formed by the +45° and −45° polarization states, also known as the +45° basis and −45° basis.

In practice, each optical pulse emitted by the first and second optical sources 2 and 12 is polarization modulated as a function of the system of bases chosen by the corresponding polarization state generator, as well as by the corresponding bit generated by the latter; furthermore, the corresponding variable optical attenuator sets the average number of photons of each optical pulse.

The first and the second communications channels 20 and 22 are formed, for example, by corresponding fibre optic spans and are such that the first-source pulses and the second-source pulses reach the third communications device C in a substantially synchronized manner.

The third communications device C is able to perform a so-called Bell measurement on the received photons and publicly announce the results of the measurement. In other words, the third communications device C is a Bell state analyzer (BSA). To that end, as shown in FIG. 2, the third communications device C comprises a first, a second and a third optical beam splitter 31, 32 and 34.

The first optical beam splitter 31 is of the non-polarizing type and also of the so-called 50/50 type; in addition, the first optical beam splitter 31 has two inputs and is able to receive pulse pairs, each pulse pair being formed by a respective first-source pulse, received on a first input, and a respective second-source pulse, received on a second input.

The first optical beam splitter 32 has a first and a second output, which are optically connected to the inputs of the second and third optical beam splitters 32 and 34, respectively, which are of the polarizing beam splitter (PBS) type, each one having a respective pair of outputs. In particular, a first and second output of the second optical beam splitter 32 are optically connected to a first and a second optical detector 40 and 42, respectively, while a first and a second output of the third optical beam splitter 34 are optically connected to a third and a fourth optical detector 44 and 46, respectively. Each one of the first, second, third and fourth optical detectors 40-46 is a so-called single-photon detector, such as a single-photon avalanche photodiode (SPAR) for example.

The polarization states, and in particular the corresponding angles, refer to the optical axes of the second and third optical beam splitters 32 and 34.

That having been said, the. Bell measurements of the third communications device C can be due to single detections of one or more photons that only reach one of the first, second, third and fourth optical detectors 40-46, in which case the Bell measurements are unusable, or coincident detections by two of the first, second, third and fourth optical detectors

40-46, in which case the Bell measurements are used. In this regard, individual detections are unusable because known types of detectors are unable to discriminate the number of photons per unit time; conversely, coincident detections are useful for the purposes of protocol implementation, because each of them indicates a projection of photons on the symmetric or antisymmetric subspace. For these reasons, except where specified otherwise, the term "Bell measurement" generally implies reference to a coincident detection; furthermore, coincident detections are also known as coincidence counts, implying that the detections refer to an observation time window, which can be taken as the unit of time.

Still more particularly, the third communications device C enables discriminating between the Bell states $|\psi^-\rangle$ and $|\psi^+\rangle$, i.e. between the singlet polarization state $(|eo\rangle-|oe\rangle)/\sqrt{2}$ and the triplet polarization state $(|eo\rangle+|oe\rangle)/\sqrt{2}$. In particular, a coincidence count c1e2o or c2e1o means than the projection took place on the singlet's antisymmetric subspace; furthermore, a coincidence count c1e1o or c2e2o means than the projection took place on the triplet's symmetric subspace. For practical purposes, the Bell state $|\psi^+\rangle$ is detected in the case of a coincidence count that involves the first and, fourth optical detectors 40 and 46, or the second and third optical detectors 42 and 44; conversely, the Bell state $|\psi^-\rangle$ is detected in the case of a coincidence count that involves the first and second optical detectors 40 and 42, or the third and fourth optical detectors 44 and 46. The results of the Bell measurements made by the third communications device C, depending on the polarization states at input of the same communications device, are listed in the table shown in FIG. 3, which refers both to the ideal case of entangled photons and to the real case of weak coherent pulses.

In detail, if the first and second communications devices A and B transmit orthogonal polarizations in the rectilinear basis, the third communications device C detects state $|\psi^-\rangle$ or $|\psi^+\rangle$; in consequence, the first and second communications devices A and B perform a so-called "bit-flip" to correlate their bits, associated with the transmitted polarizations. Conversely, if the first and second communications devices A and B use the diagonal basis, the bit-flip operation is only performed if the third communications device C detects state $|\psi^-\rangle$.

In greater detail, the first and second communications devices A and B communicate the systems of bases they use to each other over the public channel 30. In turn, as previously mentioned, the third communications device C communicates the Bell measurements it has obtained to the first and second communications devices A and B over the public channel 30.

In the process of generating the key, the first and second communications devices A and B discard measurements made on signals encoded with discordant polarization states and only keeps measurements made on signals encoded with concordant polarization states; furthermore, the bits kept and obtained with the rectilinear basis are used for the generation of the key, while the bits kept and obtained with the diagonal basis are used, for example, to evaluate the so-called quantum bit error rate (QBER) and the so-called channel gain.

In practice, given a set of bits determined by one of the first and second communications devices A and B, the set of bits obtained with the rectilinear bases and the same polarization states defines a corresponding raw key, also known as a "sifted key". Furthermore, the raw keys generated by the first and second communications devices A and B should be the mutual negation of each other, and so be equal, apart from the above-mentioned bit-flip process, which is a logical negation process. As this process of logical negation is considered implicit, in the jargon, it is said that, ideally, the raw keys generated, by the first and second communications devices A and B should coincide.

In reality, the two raw keys do not coincide, owing to the non-ideality of the distribution system 1, and also as a result of possible eavesdropping perpetrated by an unauthorized third, party. Therefore, after having generated the raw keys, the first and second communications devices A and B perform two further steps, which result in the generation of a single cryptographic key. These further steps of the BB84 protocol are respectively known as key reconciliation and privacy amplification, and were described for the first time by C. H. Bennett, F. Bessette, G. Brassard, L. Salvail and J. Smolin in "*Experimental Quantum Cryptography*", Journal of Cryptology, vol.5, n.1, 1992, pp. 3-28.

In particular, in the key reconciliation step (also known as the error correction step), the first and second communications devices A and B correct the errors present in the two raw keys, so as to generate a reconciled key, identical for both of them.

In detail, in the key reconciliation step, the first and second communications devices A and B exchange information useful for correcting the errors present in the raw keys over the public channel 30, minimizing the information transmitted with respect to each raw key.

At the end of the information reconciliation step, the first and second communications devices A and B have a same reconciled key.

Subsequently, in the privacy amplification step and on the basis of the reconciled key, the first, and second communications devices A and B generate a secure key, which can at last be used by the first and second communications devices A and B, or by the respective users, to initiate a secure communication session, for example via the public channel 30. The described operations are then repeated, periodically for example, to determine new secure keys, for new communication sessions.

In general, the steps of key reconciliation and privacy amplification reduce the efficiency of secure key generation and, in particular, the so-called key generation rate per pulse.

In this regard, the notation $Q_{rect}^{n,m}$, $Q_{diag}^{n,m}$, $e_{rect}^{n,m}$ $e_{diag}^{n,m}$ is usually adopted to indicate, respectively, the gains and the QBERs of the signal states sent by the first and second communications devices A and B; according to this notation, n and m indicate the average numbers of photons transmitted respectively by the first and second communications devices A and B, while rect and diag respectively identify the rectilinear basis and the diagonal basis. Independently of the notation, in the case of mutually equal rectilinear polarization states, an error corresponds to detection by the third communications device C of the state $|\psi^-\rangle$ or $|\psi^+\rangle$. Furthermore, ideally, $e_{rect}^{n,m}$ is null for all values of n and m; therefore, ideally, the error correction step is unnecessary.

In reality, as previously mentioned, errors do occur, and therefore the steps of error correction and privacy amplification are performed. In particular, the measurements obtained by the third communications device C with diagonal bases are used to determine the characteristics and extent of the privacy amplification operations. In this case, an error corresponds to projection in the singlet state, if the first and second communications devices A and B have generated the same polarization state, or in the triplet state, if the first and second communications devices A and B have generated orthogonal polarization states. Ideally, $e_{diag}^{1,1}=0$ is found, because, when two identical photons reach the first optical beam splitter 31, the Hong-Ou-Mandel effect ensures that both photons exit on the same output.

In the light of the foregoing, the key generation rate is, ideally, equal to $Q_{rect}^{1,1}$, in the asymptotic limit of an infinitely long key. In reality, considering the non-idealities, the key generation rate is equal to:

$$R = Q_{rect}^{1,1}[1 - H(e_{diag}^{1,1})] - Q_{rect}f(E_{rect})H(E_{rect})$$

where $Q_{rect}$ and $E_{rect}$ respectively, indicate the gain and the QBER when the first and second communications devices A and B both use the rectilinear basis, namely:

$$Q_{rect} = \sum_{n,m} Q_{rect}^{n,m}$$

and $$E_{rect} = \sum_{n,m} Q_{rect}^{n,m} e_{rect}^{n,m} / Q_{rect}$$

while $f(E_{rect}) > 1$ is a function that allows for the inefficiency of the error correction process; finally, $H(x) = -x\log(x) - (1-x)-x\log(1-x)$, which is the binary Shannon entropy function. It has also been implicitly assumed that the so-called decoy states method can be used for determining the values of gain $Q_{rect}^{1,1}$ and error $e_{diag}^{1,1}$.

In this regard, hereinafter it is assumed that the first, second, third and fourth optical detectors 40-46 have the same level of noise, or rather that they have the same dark count and the same detection efficiency. It is also assumed that the dark counts are independent of the received optical pulses and also that the first and second communications channels 20 and 22 are formed by corresponding fibre optic spans with attenuation, at the wavelength of the first and second source pulses, of 0.2 dB/km. The following is also assumed:

f($E_{rect}$)=1.16;
intrinsic error rate due to misalignment and instability of the distribution system equal to 1.5%;
detection efficiency of the optical detectors and transmittance of optical components equal to 15%;
background counts rate, inclusive of the so-called dark counts and contributions due to so-called stray light, equal to $6.02*10^{-6}$.

That having been said, FIG. 4 shows, with a. broken line, the lower limit of the key generation rate R that characterizes distribution system 1 in the case of weak coherent pulses. In addition, FIG. 4 shown, with an unbroken line, the lower limit of the key generation rate R that characterizes distribution system 1 in the case where the first and second communications devices A and B generate pairs of two-photon entangled states, such as in the case, for example, in which the pairs of photons are generated by spontaneous parametric down conversion (SPDC) of a source interposed between the first and second communications devices A and B. In practice, SPDC sources are still technologically limited at present, and so the effective value of the key generation rate R is less than that shown by the unbroken line in FIG. 4.

For practical purposes, FIG. 4 shows that the key generation rate R that can be obtained in the case of weak coherent pulses is comparable to that obtained through the generation of entangled states. Furthermore, the distribution system 1 can tolerate high optical losses, in the order of 40 dB (corresponding to a distance of approximately 200 km) when the third communications device C is placed in the middle between the first and second communications devices A and B.

Based on what has been described, it is evident how the practical implementation of a cryptographic key distribution scheme entails certain limitations with respect to theory, even in the absence of eavesdropping. In particular, the fact that the signals emitted by the sources are not single-photon states, but weak coherent pulses with an average number of photons typically greater than or equal to 0.1, entails risk for protocol security and a reduction in the key generation rate R and the useful distance for key generation, intended as the sum of the distances of the first and second communications channels 20 and 22. In fact, since some pulses contain multiple photons with a same polarization state, it is possible that a third party who wishes to intercept the cryptographic key could operate without the limitations imposed by the no-cloning theorem, as some pulses contain multiple copies of a same item of information. In particular, a third party, known in the jargon as Eve, could implement a so-called photon number splitting (PNS) attack on the multiphoton pulses. Thus, Eve could block the single-photon pulses and split the multiphoton pulses, keeping a copy for herself and sending the remaining part to the third communications device C. This attack enables Eve to obtain all of the information regarding the part of the key generated with multiphoton pulses, without introducing any polarization disturbance.

In addition, as previously mentioned, further causes that result in a reduction in the key generation rate R or, for the same key generation rate R, in the maximum reachable distance, originate from the non-ideality of the optical detectors, as well as from the difference that exists between the alignment between the first and third communications devices A and C, and the alignment between the second and third communications devices B and C.

The foregoing reasoning regarding the reduction in the key generation rate R also applies to cryptographic key distribution systems in which the optical pulses are phase encoded instead of polarization encoded, as described, for example, in Physical Review A 86, 062319 (2012), "Alternative schemes for measurement-device-independent quantum key distribution", by Xiongfeng Ma et al., and in Physical Review Letters 108, 130503 .(2012), "Measurement-Device-Independent Quantum Key Distribution", by Hoi-Kwong Lo et al., or in systems that envisage conversion from phase encoding to polarization encoding.

DISCLOSURE OF INVENTION

The object of the present invention is therefore to provide a quantum cryptographic key distribution system that at least partially overcomes the limitations of the known art.

According to the present invention, a cryptographic key distribution system and method are provided as defined in the appended claims.

BRIEF DESCRIPTION OF THE DRAWINGS

For a better understanding of the invention, some embodiments will now be described, purely by way of a non-limitative example, and with reference to the attached drawings, where:

FIG. 3 shows a table indicating the probabilities of two different types of coincidence count ($|\psi^-\rangle$ and $|\psi^+\rangle$), based on two different types of input state (entangled states or weak coherent pulses), as well as the polarization states of two signals coming from two communications devices;

FIG. 7 shows a table indicating the detections ideally made within the system shown in FIG. 5, as phase shifts introduced by the system vary;

BEST MODE FOR CARRYING OUT THE INVENTION

Figure 1:
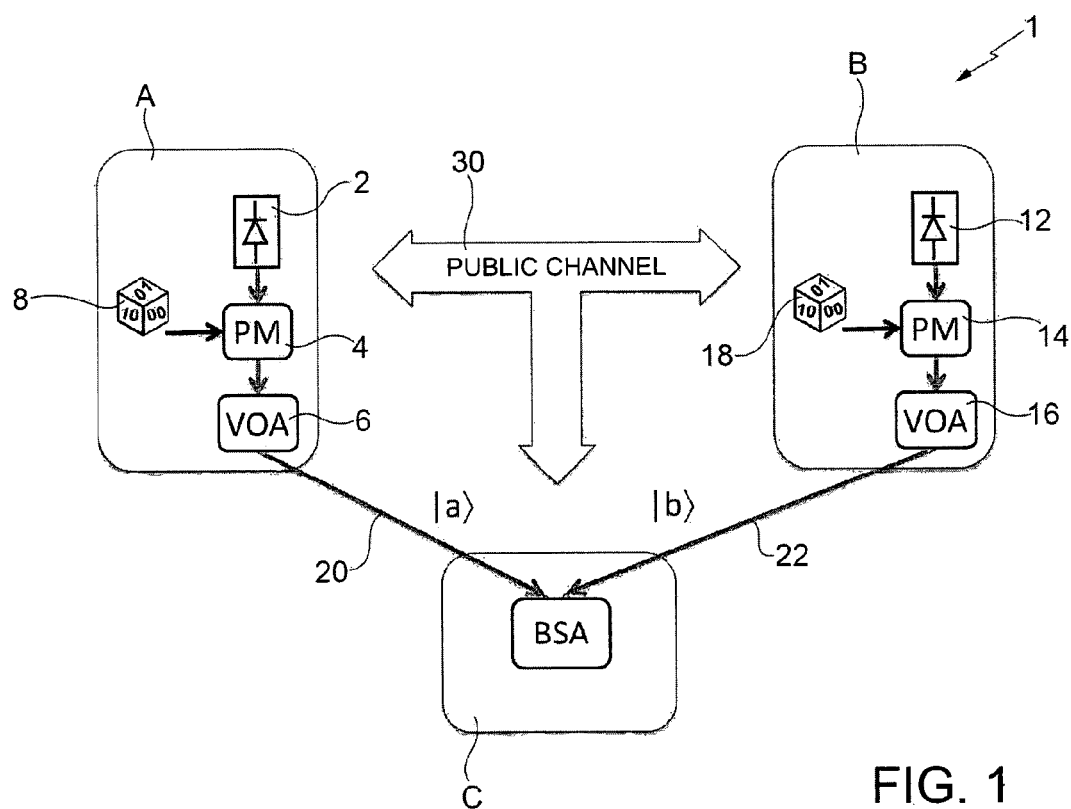
FIG. 1 shows a block diagram of a cryptographic key distribution system of known type.
Figure 2:
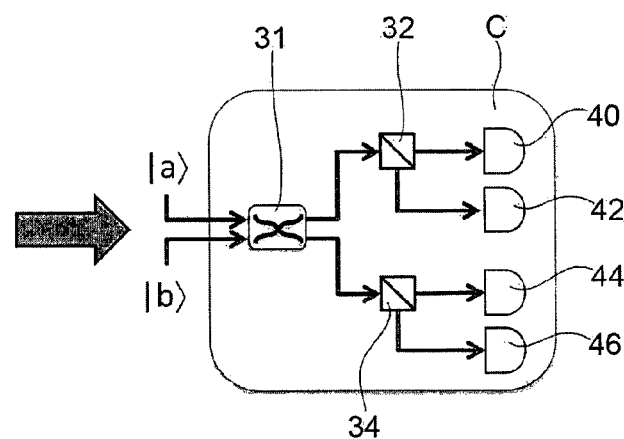
FIG. 2 shows a block diagram of a component of the cryptographic key distribution system shown in FIG. 1.
Figure 4:
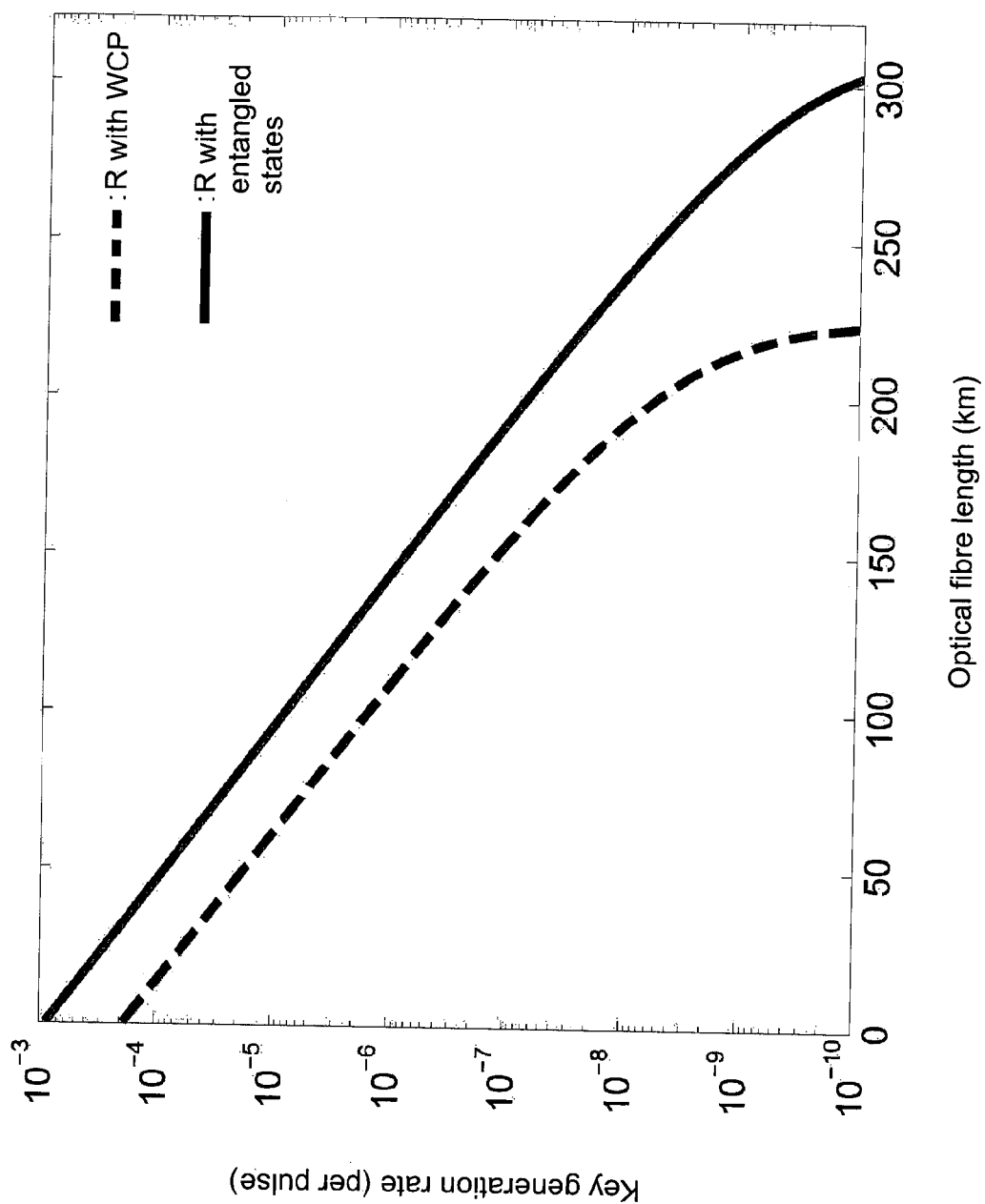
FIG. 4 shows the trend of the key generation rate that characterizes the distribution system shown in FIG. 1, as a function of distance, and in the cases of i) weak coherent pulses and ii) two-photon entangled states.
Figure 5:
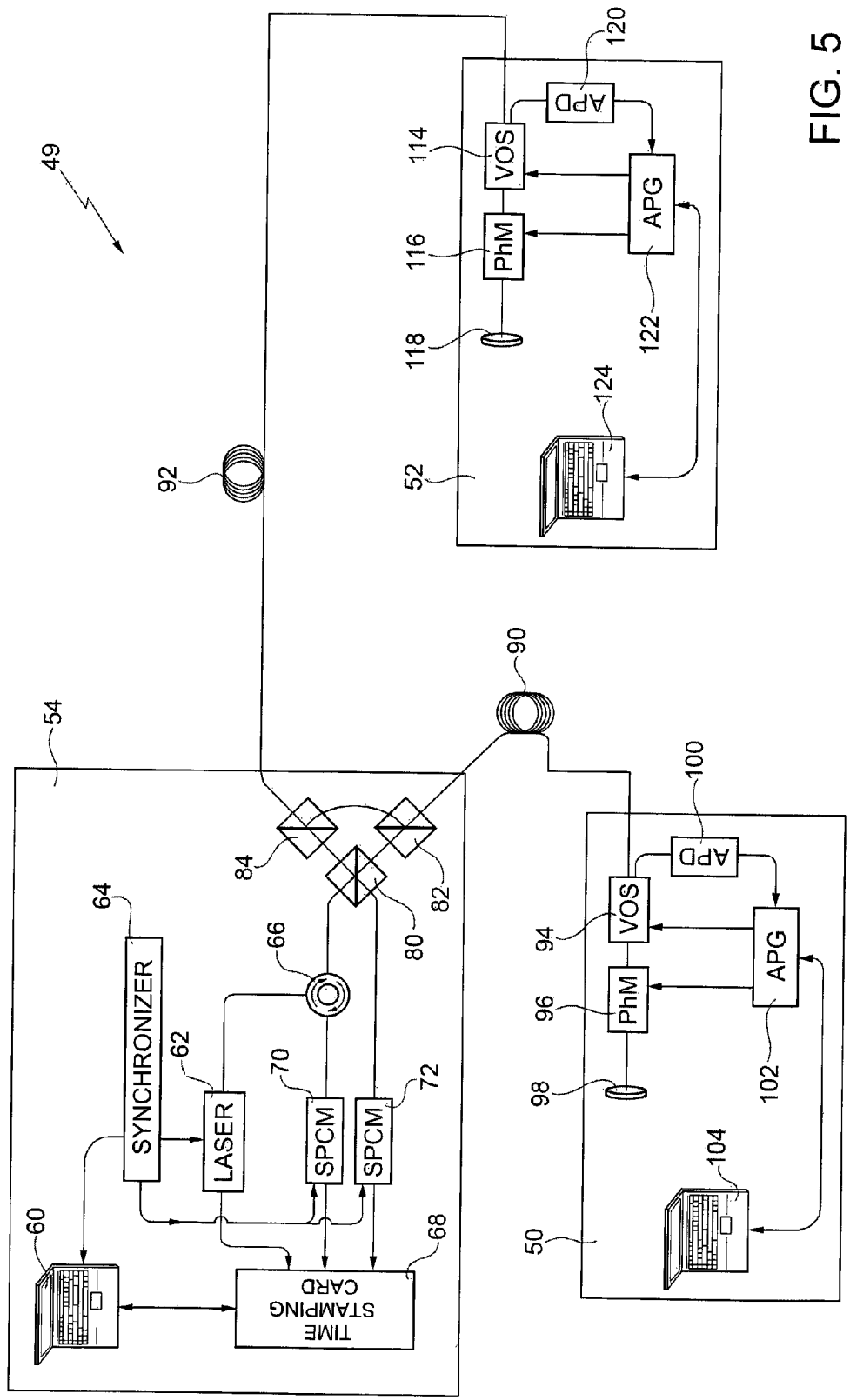
FIG. 5 shows a block diagram of the present cryptographic key distribution system.

FIG. 5 shows a cryptographic key distribution system, which shall hereinafter be referred to as the cryptographic system 49, which comprises a first, a second and a third communications device 50, 52 and 54, which shall hereinafter be referred to respectively as the first and second peripheral devices 50 and 52 and the central device 54.

The central device 54 comprises a first processing unit 60, an optical source 62, a synchronization unit 64, an optical circulator 66, a time stamping card 68 and a first and a second optical detection unit 70 and 72. In addition, the central device 54 comprises a first, a second and a third optical beam splitter 80, 82 and 84.

In detail, the synchronization unit 64 is connected to the optical source 62, to which it supplies an electrical control signal, so as to control the generation over time of optical pulses by the optical source 62, which is a laser source of known type and generates weak coherent pulses on its optical output. In addition, the synchronization unit 6 is also electrically connected to the first processing unit 60 and provides the latter with a signal indicative of the electrical control signal.

The optical circulator 66 has three ports. The first port is connected to the output of the optical source 62, so as to receive the optical pulses generated by the latter. The second port is connected to a first port of the first optical beam splitter 80. Finally, the third port is connected to a first input of the first optical detection unit 70. It should be noted that in the present description, when reference is made to an optical link, it is generally intended that this link is formed by a corresponding length of optical fibre, except where specified otherwise. Furthermore, except where specified otherwise, it is intended that the portions of optical fibre employed are of known type and polarization maintaining. In any case, embodiments are possible in which at least part of the optical links that form the cryptographic system 49 are of different types, such as free-space links for example.

In greater detail, each of the first and second optical detection units 70 and 72 is of known type and is formed by a so-called single photon counter module (SCPM) including, for example, a respective avalanche photodiode operating in Geiger mode. In addition, each of the first and second optical detection units 70 and 72 has a first input, of an optical type, and a second input, of an electrical type, the second input being connected to the synchronization unit 64, so as to receive a signal from the latter indicative of the electrical control signal. Furthermore, while, as mentioned, the first input of the first optical detection unit 70 is optically connected to the third port of the optical circulator 66, the first input of the second optical detection unit 72 is connected to a second port of the first optical beam splitter 80. Furthermore, each of the first and second optical detection units 70 and 72 has a respective output, of an electrical type, which is connected to a corresponding input of the time stamping card 68; in this regard, the time stamping card 68 has a further input, connected to an electrical output of the optical source 62, and is further configured to electrically communicate in a bidirectional manner with the first processing unit 60. In particular, the time stamping card 68 receives an electrical signal from the optical source 62 indicative of the generation times of the optical pulses and communicates this information to the first processing unit 60.

In greater detail, the first optical beam splitter 80 is a four-port device and thus, in addition to the already mentioned first and second ports, comprises a third and a fourth port. Furthermore, the first optical beam splitter 80 is of the 50/50 type and so each optical pulse that is received on the first port is split into equal parts on the third and fourth ports, without altering its polarization. In other words, the first optical beam splitter 80 is of the non-polarizing type.

Each of the second and third optical beam splitters 84 and 82 is a three-port polarizing beam splitter. In particular, a first port of the second optical beam splitter is optically connected to the third port of the first optical beam splitter 80, while a first port of the third optical beam splitter 84 is optically connected to the fourth port of the first optical beam splitter 80.

In greater detail, a second port of the second optical beam splitter 82 is optically connected, through a first fibre optic span 90, to the first peripheral device 50, while a second port of the third optical beam splitter 84 is optically connected, through a second fibre optic span 92, to the second peripheral device 52. In addition, the third ports of the second and third optical beam splitters 82 and 84 are optically connected to each other.

The first peripheral device 50 comprises a first variable optical splitter 94, a first phase modulator 96, a first Faraday mirror 98, a first avalanche photodiode 100, a first arbitrary pulse generator (APG) 102 and a second processing unit 104.

In detail, the first variable optical splitter 94 functions as a variable attenuator and has a first, a second and a third port of an optical type, the first port being connected to the first fibre optic span 90, which has a length equal to $L_A$. Furthermore, the first variable optical splitter 94 has a control input, of an electrical type, on which it receives a first phase control signal, generated by the first arbitrary pulse generator 102 on a respective first output of an electrical type.

The first phase modulator 96 has a first and a second port, the first port being connected to the second port of the first variable optical splitter 94. The second port is instead connected to the first Faraday mirror 98. In addition, the first phase modulator 96 has a respective control input, of an electrical type, on which it receives a first amplitude control signal, generated by the first arbitrary pulse generator 102 on a respective second output of an electrical type.

The first avalanche photodiode 100 has an optical input, which is connected to the third port of the first variable optical splitter 94. In addition, the first avalanche photodiode 100 has an electrical output, which is connected to a first electrical input of the first arbitrary pulse generator 102.

With regard to the first arbitrary pulse generator 102, this also has a second electrical input, which is electrically connected to the second processing unit 104.

The second peripheral device 52 comprises a second variable optical splitter 114, a second phase modulator 116, a second Faraday mirror 118, a second avalanche photodiode 120, a second arbitrary pulse generator 122 and a third processing unit 124.

In detail, the second variable optical splitter 114 has a first, a second and a third port, of an optical type, the first port being connected to the second fibre optic span 92, which has a length equal to $L_B$. Furthermore, the second variable optical splitter 114 has a control input, of an electrical type, on which it receives a second phase control signal, generated by the second arbitrary pulse generator 122 on a respective first output of an electrical type.

The second phase modulator 116 has a first and a second port, the first port being connected to the second port of the second variable optical splitter 114. The second port is instead connected to the second Faraday mirror 118. In addition, the second phase modulator 116 has a respective control input, of an electrical type, on which it receives a second amplitude control signal, generated by the second arbitrary pulse generator 122 on a respective second output of an electrical type.

The second avalanche photodiode 120 has an optical input, which is connected to the third port of the second variable optical splitter 114. In addition, the second avalanche photodiode 120 has an electrical output, which is connected to a first input, of an electrical type, of the second arbitrary pulse generator 122.

With regard to the second arbitrary pulse generator 122, this also has a second electrical input, which is electrically connected to the third processing unit 124.

Operationally, given an optical pulse that arrives on the first port of the first optical beam splitter 80 with a first polarization, one half of it reaches the first peripheral device 50, after having crossed the second optical beam splitter 82 and the first fibre optic span 90, while a second half of it reaches the second peripheral device 52, after having crossed the third optical beam splitter 84 and the second fibre optic span 92. For reasons of clarity, hereinafter the above-mentioned first and second optical pulse halves will be respectively referred to as the first and second optical sub-pulses. In practice, the first and second optical sub-pulses are respectively generated on the third and fourth ports of the first optical beam splitter 80. Furthermore, it is assumed, without any loss of generality, that the above-mentioned first polarization is a so-called horizontal polarization.

Inside the first peripheral device 50, the first optical sub-pulse passes through the first variable optical splitter 94 and the first phase modulator 96 a first time, the latter being kept inactive during the passage, until it impinges on the first Faraday mirror 98, which has an orthonormal transfer matrix and reflects it, inverting the polarization. The first sub-pulse then passes a second time, in the opposite direction, through the first phase modulator 96, which is also kept inactive during this further passage, and the first variable optical splitter 94.

Following the second passage through the first variable optical splitter 94, part of the first optical sub-pulse, which for reasons of clarity will still be referred to as the first optical sub-pulse, is again directed towards the first fibre optic span 90, while a part is directed to the first avalanche photodiode 100. In consequence, the first avalanche photodiode 100 sends an electrical signal to the first arbitrary pulse generator 102 indicative of the transit time of the first optical sub-pulse through the first variable optical splitter 94, and therefore the time at the first peripheral device 50, as well as the power of the first optical sub-pulse, or rather the power of the signal sent from the central device 54.

Afterwards, the first optical sub-pulse passes through the first fibre optic span 90 again, until it impinges on the second port of the second optical beam splitter 82, with vertical polarization, due to the polarization performed by first Faraday mirror 98. Thus, the first optical sub-pulse is reflected by the second optical beam splitter 82 and directed to the third port of the second optical beam splitter 82, and therefore to the third port of the third optical beam splitter 84.

Afterwards, the first optical sub-pulse is reflected by the third optical beam splitter 84, which directs it to its second port. The first optical sub-pulse thus passes through the second fibre optic span 92 and reaches the second peripheral device 52.

Inside the second peripheral device 52, the first optical sub-pulse passes through the second variable optical splitter 114 and the second phase modulator 116 a first time, until it impinges on the second Faraday mirror 118, which reflects it inverting the polarization. The first sub-pulse then passes a second time, in the opposite direction, through the second phase modulator 116 and the second variable optical splitter 114.

Following the second passage through the second variable optical splitter 114, part of the first optical sub-pulse, which for reasons of clarity will still be referred to as the first optical sub-pulse, is again directed towards the second fibre optic span 92, while a part is directed to the second avalanche photodiode 120. In consequence, the second avalanche photodiode 120 sends an electrical signal to the second arbitrary pulse generator 122 indicative of the transit time of the first optical sub-pulse through the second variable optical splitter 114, and therefore the time at the second peripheral device 52, as well as the power of the first optical sub-pulse, or rather the power of the signal sent from the first peripheral device 50.

In greater detail, the third processing unit 124 controls the second arbitrary pulse generator 122 in a manner such that it controls the second phase modulator 116 so that the double passage of the first optical sub-pulse through it results in phase modulation, i.e. phase encoding, of the first optical sub-pulse. In addition, the second variable optical splitter 114 attenuates the first optical sub-pulse with an attenuation, intended as the difference between the power with which the first optical pulse impinges on the second peripheral device 52 and the power with which it is redirected by the later to the second fibre optic span 92, which is greater than the attenuation introduced by the first variable optical splitter 94 on the first optical pulse.

Afterwards, the first optical sub-pulse passes through the second fibre optic span 92 again, until it impinges on the second port of the third optical beam splitter 84.

As the first optical sub-pulse, due to the polarization inversion performed by the second Faraday mirror 118, impinges on the second port of the third optical beam splitter 84 with ordinary polarization, it passes through the third optical beam splitter 84 and reaches the fourth port of the first optical beam splitter 80.

Instead, with regard to the above-mentioned second optical sub-pulse generated on the fourth port of the first optical beam splitter 80, this traverses an optical path identical to that followed by the first optical pulse, but in the opposite direction.

In greater detail, inside the second peripheral device 52, the second optical sub-pulse passes through the second variable optical splitter 114 and the second phase modulator 116 a first time, the latter being kept inactive during the passage, until it impinges on the second Faraday mirror 118, which reflects it, inverting the polarization. The second sub-pulse then passes a second time, in the opposite direction, through the second phase modulator 116, which is also kept inactive during this further passage, and the second variable optical splitter 114.

Following the second passage through the second variable optical splitter 1144, part of the second optical sub-pulse, which for reasons of clarity will still be referred to as the second optical sub-pulse, is again directed towards the second fibre optic span 92, while a second part is directed to the second avalanche photodiode 120. In consequence, the second avalanche photodiode 120 sends an electrical signal to the second arbitrary pulse generator 122 indicative of the transit time of the second optical sub-pulse through the second variable optical splitter 114, and therefore the time at the second peripheral device 52, as well as the power of the second optical sub-pulse, or rather the power of the signal sent from the central device 54.

Afterwards, the second optical sub-pulse passes through the second fibre optic span 92 again, until it strikes the second port of the third optical beam splitter 84, with extraordinary polarization, due to the polarization inversion performed by the second Faraday mirror 118. Thus, the second optical sub-pulse is reflected by the third optical beam splitter 84 and directed to the third port of the third optical beam splitter 84, and therefore to the third port of the second optical beam splitter 82.

The second optical sub-pulse is then reflected by the second optical beam splitter 82, which directs it to its second port. The second optical sub-pulse thus passes through the first fibre optic span 90 and reaches the first peripheral device 50.

Inside the first peripheral device 50, the second optical sub-pulse passes through the first variable optical splitter and the first phase modulator 96 a first time, until it impinges on the first Faraday mirror 98, which reflects it, inverting the polarization.

The second optical sub-pulse then passes a second time, in the opposite direction, through the first phase modulator 96 and the first variable optical splitter 94. In particular, after the second passage through the first variable optical splitter 94, part of the second optical sub-pulse, which for reasons of clarity will still be referred to as the second optical sub-pulse, is again directed towards the first fibre optic span 90, while a part is directed to the first avalanche photodiode 100. In consequence, the first avalanche photodiode 100 sends an electrical signal to the first arbitrary pulse generator 102 indicative of the transit time of the second optical sub-pulse through the first variable optical splitter 94, and therefore the time at the first peripheral device 50, as well as the power of the second optical sub-pulse, or rather the power of the signal sent from the second peripheral device 52.

In greater detail, the second processing unit 104 controls the first arbitrary pulse generator 102 in a manner such that it controls the first phase modulator 96 so that the double passage of the second optical sub-pulse through it results in phase modulation, i.e. phase encoding, of the second optical sub-pulse. In addition, the first variable optical splitter 94 attenuates the second optical sub-pulse with an attenuation, intended as the difference between the power with which the second optical pulse impinges on the first peripheral device 50 and the power with which it is redirected by the later to the first fibre optic span 90, which is greater than the attenuation introduced by the second variable optical splitter 114 on the second optical pulse.

Afterwards, the second optical sub-pulse passes through the first fibre optic span 90 again, until it impinges on the second port of the second optical beam splitter 82.

As the second optical sub-pulse, due to the polarization inversion performed by the first Faraday mirror 98, impinges on the second port of the second optical beam splitter 82 with ordinary polarization, it passes through the second optical beam splitter 82 and reaches the third port of the first optical beam splitter 80.

In detail, with regard to the phase encoding performed by the first and second phase modulators 96 and 116 on the first and second optical sub-pulses, respectively, the first phase modulator 96 phase shifts the second optical sub-pulse by a phase $\phi_A$; furthermore, the second phase modulator 116 phase shifts the first optical sub-pulse by a phase $\phi_B$.

In greater detail, in order to determine phase $\phi_A$, the first phase modulator 96 randomly selects a system of bases from a first system of bases, formed by angles $\{0, \pi\}$, and a second system of bases, formed by angles $$\left\{\frac{\pi}{2}, \frac{3\pi}{2}\right\}.$$

Furthermore, after having selected a system of bases, the first phase modulator 96 randomly selects one of the two angles that form the selected system of bases and sets phase $\phi_A$ equal to the selected angle.

Similarly, in order to determine phase $\phi_B$, the second phase modulator 96 randomly selects a system of bases from the first and second systems of bases. Afterwards, the second phase modulator 96 randomly selects one of the two angles that form the selected system of bases and sets phase $\phi_B$ equal to the selected angle.

Figure 6:
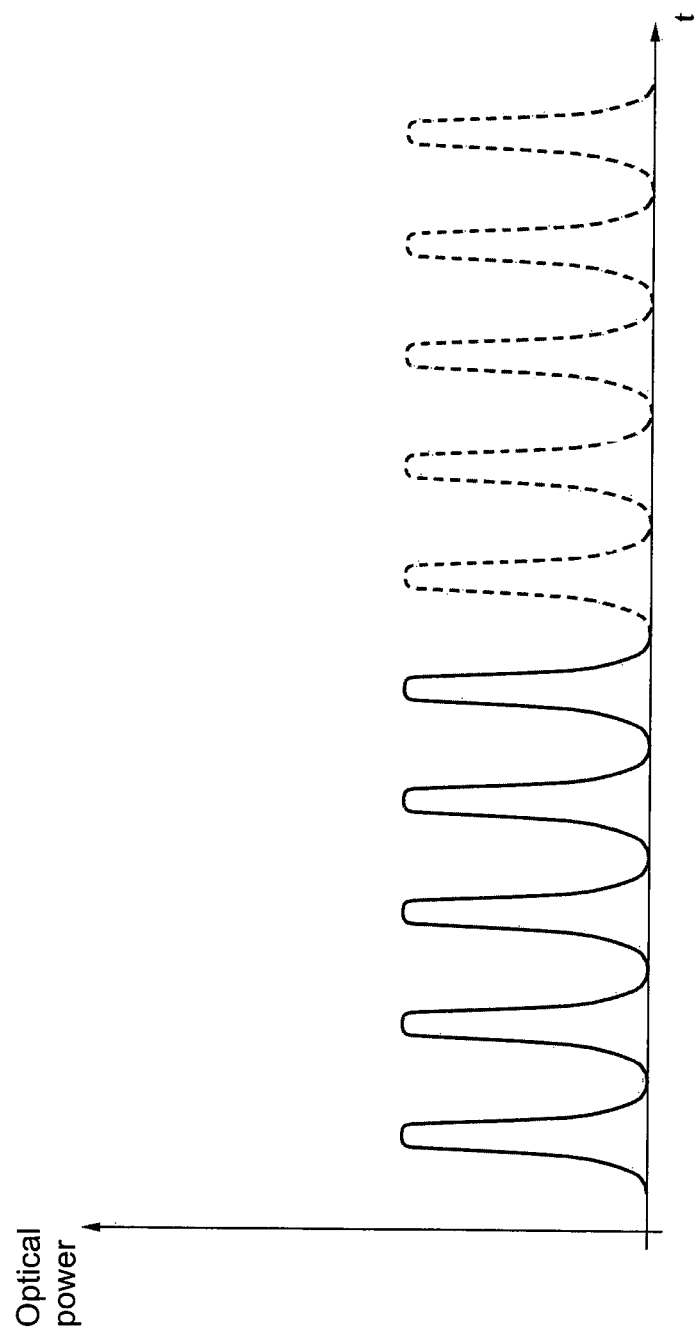
FIG. 6 qualitatively shows a succession of optical pulses of a first and a second type, as received in time by a component of the system shown in FIG. 5.

As shown in greater detail in FIG. 6, given a sequence of number NUM (in FIG. 6, NUM=5) of optical pulses generated by the optical source 62, the cryptographic system 49 is such that the first peripheral device 50 experiences the passage of NUM first optical sub-pulses (indicated by the unbroken line), and only afterwards the passage of NUM second optical sub-pulses (indicated by the broken line). Conversely, although not shown, the second peripheral device 52 experiences the passage of NUM second optical sub-pulses, and only afterwards the passage of NUM first optical sub-pulses. Furthermore, the optical source 62 does not transmit any further optical pulse until all of the NUM pairs of first and second optical sub-pulses have reached the first optical beam splitter 80. Moreover, with reference, for example, to the first peripheral device 50, this keeps the first variable optical splitter 94 and the first phase modulator 96 inactive during the transit of the first optical sub-pulses, while it randomly controls, as previously explained, the first phase modulator 96 during the transit of each of the second optical sub-pulses.

That having been said, since the first and second optical sub-pulses respectively impinge on the fourth and third ports of the first optical beam splitter 80 after having traversed an identical optical path, they are temporally aligned; furthermore, this optical path, the two ends of which are respectively connected to the third and fourth ports of the first optical beam splitter 80, is self-stabilizing in phase.

In practice, the first and second optical sub-pulses respectively impinge on the fourth and third ports of the first optical beam splitter 80 concurrently, and also with a same polarization. Therefore, the first and second optical sub-pulses, which are also mutually coherent, can interfere and the first optical beam splitter 80 behaves like a so-called Sagnac interferometer. Furthermore, in the case in which the first and second optical sub-pulses form corresponding signal states (a description of the signal states is provided hereinafter), the attenuation introduced by the first and second variable optical splitters 94 and 114 on the first and second optical sub-pulses is such that the input state on the third and fourth ports of the first optical beam splitter 80 (which is precisely referred to as a signal state) has an average number of photons μ substantially equal to one, i.e. it is a so-called single-photon state. It should be noted that, in general, the term "signal state" is also used to indicate the phase states individually generated by the first and second peripheral devices 50 and 52, when these phase states contribute to forming a corresponding signal state on the third and fourth ports of the first optical beam splitter 80.

In practice, the detections made by the first and second optical detection units 70 and 72 depend on the phases $\phi_A$ and $\phi_B$ introduced by the first and second phase modulators 96 and 116. More in particular, if the first and second peripheral devices 50 and 52 have selected a same system of bases and the values of the phases $\phi_A$ and $\phi_B$ are the same, the second optical detection unit 72 will detect an optical signal, otherwise optical signal detection occurs on the first optical detection unit 70. Conversely, if the first and second peripheral devices 50 and 52 have selected two different systems of bases, the corresponding signal detections are not deterministic and must be discarded. More in particular, the occurrences of signal detection by the first or by second optical detection unit 70 and 72 (indicated respectively as SPCM 1 and SPCM 2), depending on the phases $\phi_A$ and $\phi_B$, are listed in the table shown in FIG. 7. The corresponding key bit obtained and the opportunity of performing a bit-flip operation are also indicated in this table.

In practice, the first and second optical sub-pulses interfere in the first optical beam splitter 80 in such a manner that, if the phases $\phi_A$ and $\phi_B$ are equal to angles belonging to a same system of bases, the interference generates an optical signal deterministically directed to the first or to the second optical detection unit 70 or 72, depending on whether the phases $\phi_A$ and $\phi_B$ are equal or not.

The first and the second optical detection units 70 and send electrical signals to the time stamping card 68 indicative of the respective detections and the corresponding detection times; this information is then communicated by the time stamping card 68 to the first processing unit 60, which in turn transmits it, together with information regarding the generation times of the optical pulses, to the second and third processing units 104 and 124, over the public channel.

From an analytical viewpoint, the cryptographic system 49 can be described by modelling the optical source 62 as an attenuated coherent state. In particular, by assuming that the phase of each optical pulse is completely random, the number of photons for each optical pulse follows a Poisson distribution with an average number of photons equal to $|\alpha|^2$. The state emitted from the optical source 62 is given by:

$$|\alpha\rangle = e^{-\frac{|\alpha|^2}{2}} \sum_{n=0}^{\infty} \frac{\alpha^n}{n!} a_1^{\dagger n} |0\rangle$$

The first optical beam splitter 80 introduces the transformation:

$$|\alpha\rangle = e^{-\frac{|\alpha|^2}{2}} \sum_{n=0}^{\infty} \frac{\alpha^n}{n!} \left(\frac{a_A^\dagger - a_B^\dagger}{\sqrt{2}}\right)^n |0\rangle$$

where the subscripts A and B refer to modes respectively identified by the first and second fibre optic spans 90 and 92, i.e. by the fibre optic communications channels respectively running to the first and second peripheral devices 50 and 52. The state can be rewritten in the form:

$$|\alpha\rangle = e^{-\frac{|\alpha|^2}{2}} \sum_{n=0}^{\infty} \left(\frac{\alpha}{\sqrt{2}}\right)^n \sum_{k=0}^{\infty} \binom{n}{k} \frac{a_A^{\dagger k} a_B^{\dagger(n-k)}}{n!} |0\rangle =$$

$$e^{-\frac{|\alpha|^2}{2}} \sum_{n=0}^{\infty} \left(\frac{\alpha}{\sqrt{2}}\right)^{n-k} \frac{a_B^{\dagger(n-k)}}{(n-k)!} |0\rangle \sum_{k=0}^{\infty} \left(-\frac{\alpha}{\sqrt{2}}\right)^k \frac{a_A^{\dagger k}}{k!} |0\rangle =$$

$$|\alpha/\sqrt{2}\rangle_A |-\alpha/\sqrt{2}\rangle_B$$

where $|\alpha/\sqrt{2}\rangle_A$ and $|\alpha/\sqrt{2}\rangle_B$ are still two coherent states with an average number of photons equal to half the average number of initial photons. The two states respectively travel along the first and second fibre optic spans 90 and 92.

The evolution of the two coherent states results in the state:

$$|\alpha e^{-aL_A} e^{-\nu_{A1}}/\sqrt{2}\rangle_A |-\alpha e^{-aL_B} e^{-\nu_{B1}}/\sqrt{2}\rangle_B$$

where $\exp(-aL_A)$ and $\exp(-aL_B)$ represent the attenuation due to propagation in the first and second fibre optic spans 90 and 92, and where $\exp(-\nu_{A1})$ and $\exp(-\nu_{B1})$ indicate the attenuation introduced by the first and second peripheral devices 50 and 52, respectively on the first and second optical sub-pulses. The two coherent states propagate from the first peripheral device 50 to the second peripheral device 52, and from the second peripheral device 52 to the first peripheral device 50:

$$|\alpha e^{-a(2L_A+L_B)} e^{-\nu_{A1}}/\sqrt{2}\rangle_B |-\alpha e^{-a(L_A+2L_B)} e^{-\nu_{B1}}/\sqrt{2}\rangle_A$$

Further attenuation results in the state:

$$|\alpha e^{-a(2L_A+L_B)} e^{-(\nu_{A1}+\nu_{B2})}/\sqrt{2}\rangle_B |-\alpha e^{-a(L_A+2L_B)} e^{-(\nu_{A2}+\nu_{B1})}/\sqrt{2}\rangle_A$$

which propagates to the first optical beam splitter 80 after being phase shifted by $\phi_B$ and $\phi_A$.

The following is then obtained:

$$|\alpha e^{i\phi_B} \alpha e^{-2a(L_A+L_B)} e^{-(\nu_{A1}+\nu_{B2})}/\sqrt{2}\rangle_B \otimes |-\alpha e^{i\phi_A} e^{-2a(L_A+L_B)} e^{-(\nu_{A2}+\nu_{B1})}/\sqrt{2}\rangle_A$$

The output state from the first optical beam splitter 80, i.e. in output from the first and second ports, is given by:

$$|\alpha e^{-2a(L_A+L_B)} (e^{i\phi_B} e^{-(\nu_{A1}+\nu_{B2})} - e^{i\phi_A} e^{-(\nu_{A2}+\nu_{B1})})/2\rangle_1$$

$$\otimes \alpha e^{-2a(L_A+L_B)} (e^{i\phi_B} e^{-(\nu_{A1}+\nu_{B2})} + e^{i\phi_A} e^{-(\nu_{A2}+\nu_{B1})})/2\rangle_2$$

from which it can be deduced that maximum interference visibility is obtained with:

$$\nu_{A1} + \nu_{B2} = \nu_{A2} + \nu_{B1}$$

that is, if the overall attenuation introduced by the first and second peripheral devices 50 and 52 on the first optical sub-pulse is equal to the overall attenuation introduced by the first and second peripheral devices 50 and 52 on the second optical sub-pulse.

The final state is therefore given by:

$$|\alpha e^{-2a(L_A+L_B)}e^{-(\nu_A+\nu_B)}(e^{i\phi_B}-e^{i\phi_A})\rangle_1|\alpha e^{-2a(L_A+L_B)}e^{-(\nu_A+\nu_B)}(e^{i\phi_B}+e^{i\phi_A})/2\rangle_2$$

Again with reference to the first and second peripheral devices 50 and 52, these communicate with each other over the public channel, passing the previously selected systems of bases, but not the selected phase values. In this way, the first and second peripheral devices 50 and 52 determine a sifted key, based on the detections made by the first and second optical detection units 70 and 72 with concordant systems of bases; in this case, it is possible, for example, to associate bit "0" with angles 0 and π/2, and bit "1" with angles "π" and "3/2π", before possible inversion.

In order to increase the key generation rate R and/or increase the distance, the first and second peripheral devices and 52 implement a quantum key distribution scheme with decoy states. In particular, each of the first and second peripheral devices 50 and 52 randomly varies the attenuation it respectively introduces on some of the second optical sub-pulses (in the case of the first peripheral device 50), or on some of the first optical sub-pulses (in the case of the second peripheral device 52); in particular, the attenuation is increased with respect to the attenuation introduced by the same peripheral device in the case of the above-mentioned signal states. Furthermore, selection of the first/second optical sub-pulses to use for the generation of the decoy states takes place randomly.

Information concerning the transmission, the time of transmission and the type (average number of photons) of each decoy state is communicated by the arbitrary pulse generator of the peripheral device that has generated the decoy state to the corresponding processing unit, which in turn communicates this information to the processing unit of the other peripheral device over the public channel.

The first and the second peripheral devices 50 and 52, and in particular the second and third processing units 104 and 124, can then estimate the key generation rate R, combining the approach based on the "entanglement distillation" of Gottesman-Lo-Lutknhaus-Preskill (GLLP) with the decoy states and obtaining:

$$R \geq q\{-Q_\mu f(E_\mu)H(E_\mu)+Q_1[1-H(e_1)]\}$$

where: parameter q depends on the implementation (in particular, the probabilities with which the decoy states and the signal states are generated; for example, if these probabilities are equal, q=½); μ is indicative of the power of the signal state; $Q_\mu$ is the gain of the signal state; $E_\mu$ is to total QBER; $Q_1$ is the gain of the single-photon state; $e_1$ represents the error of the single-photon state; $f(E_\mu)$ represents the error correction efficiency with a Shannon limit given by 1; and H(x) represents the binary Shannon entropy.

Considering the case of measurement made on concordant bases and equal phases, and assuming that the phase of each optical pulse is completely random, the number of photons follows a Poisson distribution with a parameter μ that is precisely the average number of photons jointly emitted by, the first and second peripheral devices 50 and 52. The density matrix of the input state on the third and fourth ports of the first optical beam splitter 80 is given by:

$$\rho_{AB} = \sum_{i=0}^{\infty} \frac{\mu e^{-\mu}}{i!}|i\rangle\langle i|$$

For QKD systems based on optical fibre, quantum channel losses can be derived from the attenuation coefficient measured in dB/Km and the length of the optical fibre. The total transmittance of the quantum channel can be expressed as:

$$t_{Ch} = 10^{-\frac{A}{10}(L_{Ch})}$$

where A indicates the attenuation in dB/Km of the optical fibre and where $L_{Ch}$ is alternatively equal to $L_A$ or $L_B$; without any loss of generality, $L_{Ch}=L_A$ is hereinafter assumed.

It is possible to indicate the transmittance of the central device 54 (Charlie) as $\eta_{Charlie}$, which includes both the optical transmittance $t_{Charlie}$ of the central device 54, and the efficiency $\eta_D$ of the first and second optical detection units 70 and 72; this gives:

$$\eta_{Charlie}=t_{Charlie}\eta_D$$

The total efficiency of transmission and detection between the first peripheral device 50 (Alice), the second peripheral device 52 (Bob) and the central device 54 (Charlie) is therefore given by:

$$\eta=t_{Ch}\eta_{Charlie}$$

As previously mentioned, it is assumed that the first and second optical detection units 70 and 72 comprise avalanche photodiodes operating in Geiger mode, and therefore that the central device 54 is able to discriminate an empty state from a state with a certain number of photons, but is not able to discriminate the number of photons. Furthermore, it is reasonable to assume that there is statistical independence between the photons in the states with i photons. Therefore, the transmittance of the i-photon state is given by:

$$\eta_i=1-(1-\eta)^i \text{ per } i=0,1,2,\ldots$$

It is also possible to define the probability of detection by the central device 54 (and therefore, by at least one of the first and second optical detection units 70 and 72) when the input state on the third and fourth ports of the first optical beam splitter 80 is an i-photon state, as $Y_i$. In this case, $Y_0$ is the background rate; furthermore, $Y_i$ comprises both the background rate and the contributions due to the signal states. Assuming that the background counts are independent from the detection of the signal states, $Y_i$ is given by:

$$Y_i=Y_0+\eta_i-\eta_iY_0 \cong Y_0+\eta_i$$

The gain $Q_i$ of the i-photon state is given by:

$$Q_i = Y_i \frac{\mu e^{-\mu}}{i!}$$

In this regard, the gain is the product of the probability that the first and second peripheral devices 50 and 52 jointly generate an i-photon state in input on the third and fourth ports of the first optical beam splitter 80, and the conditional probability that the central device 54 detects an event, i.e. that one of the first and second optical detection units 70 and 72 makes a detection.

The error rate $e_i$ of the i-photon state is given by:

$$E_i = \frac{e_0 Y_0 + e_{detector}\eta_i}{Y_i}$$

where $e_{detector}$ is the probability that a photon is detected by the wrong unit of the first and second optical detection units 70 and 72, i.e. causing violation of the table shown in FIG. 7.

It is possible to assume that $e_{detector}$ does not depend on the length of the fibre optic spans and that the background error rate is statistically independent, i.e. $e_0 = \frac{1}{2}$. In this case, the total gain is given by:

$$Q_\mu = \sum_{i=0}^{\infty} Y_i \frac{\mu^i e^{-\mu}}{i!} = Y_0 + 1 - e^{-\eta\mu}$$

while the total QBER is given by:

$$E_\mu = \frac{1}{Q_\mu} \sum_{i=0}^{\infty} \frac{e_0 Y_0 + e_{detector}\eta_i}{Y_i} Y_i \frac{\mu^i e^{-\mu}}{i!} = \frac{e_0 Y_0 + e_{detector}(1 - e^{-\eta\mu})}{Y_0 + 1 - e^{-\eta\mu}}$$

That having been said, it is possible to try to optimize the average number μ of photons jointly emitted by the first and second peripheral devices 50 and 52, as the single-photon state is the only one that ensures security of the key. Therefore, on one hand it is possible to maximise the probability that the first and second peripheral devices 50 and 52 jointly generate a single-photon state, this probability being maximum, with Poisson statistics, for $\mu=1$; on the other hand, it is possible to reduce the gain on many photons $Q_\mu$, so as to guarantee security. For practical purposes, it is therefore possible to maximize the ratio $Q_1/Q_\mu$; intuitively, it is opportune that $\mu \in (0,1]$.

In practice, assuming that the first and second peripheral devices 50 and 52 can estimate $e_1$ and $Y_1$, and assuming that the background rate is low ($Y_0 \ll \eta$) and that the transmittance is low ($\eta \ll 1$), gives:

$$Q_\mu = Y_0 + 1 - e^{-\eta\mu} \approx \eta\mu$$

$$Q_1 = (Y_0 + \eta)\mu e^{-\mu} \approx \eta\mu e^{-\mu}$$

$$e_1 = \frac{e_0 Y_0 + e_{detector}\eta}{(Y_0 + \eta)} \approx e_{detector}$$

$$E_\mu = \frac{e_0 Y_0 + e_{detector}(1 - e^{-\eta\mu})}{Y_0 + 1 - e^{-\eta\mu}} \approx e_{detector}$$

Figure 8:
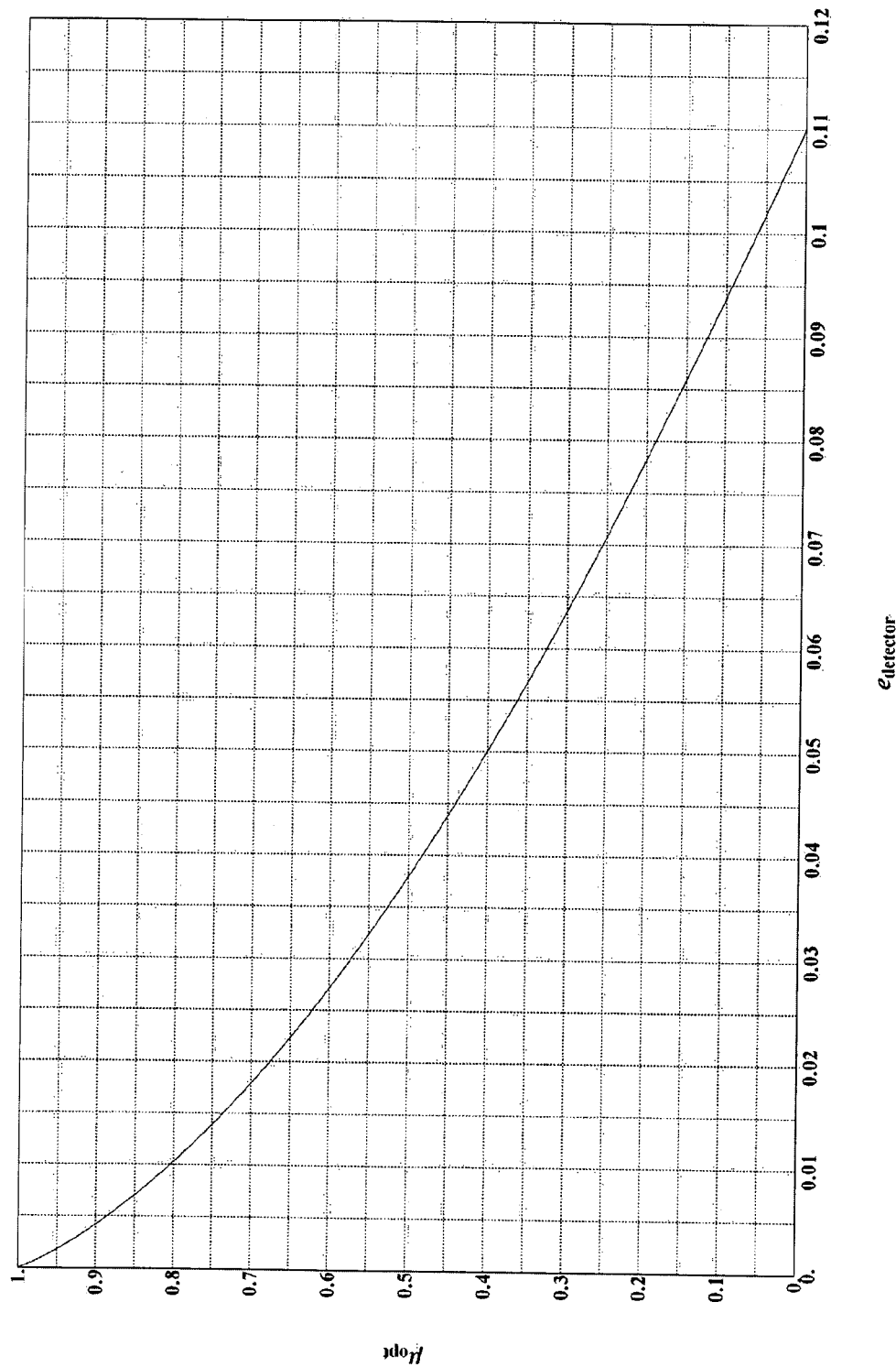
FIG. 8 shows the trend of an estimate of an optimal value for an average number of photons µ, as a function of the probability $e_{detector}$ of erroneous detection within the system shown in FIG. 5.

In this case, the key generation rate is equal to:

$$R \approx q\{-\eta\mu f(e_{detector})H(e_{detector}) + \eta\mu e^{-\mu}[1 - H(e_{detector})]\}$$

and is optimized for the value $\mu = \mu_{opt}$ that verifies the relation:

$$(1-\mu)e^{-\mu} = \frac{f(e_{detector})H(e_{detector})}{[1 - H(e_{detector})]}$$

from which it is possible to obtain the trend of $\mu_{opt}$ as a function of $e_{detector}$, as shown in FIG. 8. This value is approximate because it does not depend on background noise.

In general, if the first and second peripheral devices 50 and 52 jointly generate signal states with an average number of photons μ and decoy states with average numbers of photons equal to $v_1, v_2, \ldots, v_m$, then:

$$Q_\mu = \sum_{i=0}^{\infty} Y_i \frac{\mu^i e^{-\mu}}{i!}$$

$$E_\mu Q_\mu = \sum_{i=0}^{\infty} e_i Y_i \frac{\mu^i e^{-\mu}}{i!}$$

$$Q_{v_1} = \sum_{i=0}^{\infty} Y_i \frac{v_1^i e^{-v_1}}{i!}$$

$$E_{v_1} Q_{v_1} = \sum_{i=0}^{\infty} e_i Y_i \frac{v_1^i e^{-v_1}}{i!}$$

$$Q_{v_2} = \sum_{i=0}^{\infty} Y_i \frac{v_2^i e^{-v_2}}{i!}$$

$$E_{v_2} Q_{v_2} = \sum_{i=0}^{\infty} e_i Y_i \frac{v_2^i e^{-v_2}}{i!}$$

$$Q_{v_m} = \sum_{i=0}^{\infty} Y_i \frac{v_m^i e^{-v_m}}{i!}$$

$$E_{v_m} Q_{v_m} = \sum_{i=0}^{\infty} e_i Y_i \frac{v_m^i e^{-v_m}}{i!}$$

As m tends to infinity, the first and second peripheral devices 50 and 52 accurately determine both set $\{Y_i\}$ and set $\{e_i\}$ and obtain a new lower limit of $Y_0$:

$$Y_1[1 - H(e_1)]$$

From a practical point of view, it is not possible to use an infinite number of decoy states, however it is possible to demonstrate that a finite and limited number of decoy states is sufficient to obtain an accurate estimate of the gain and error due to single-photon states.

For example, it is possible to assume that the first and second peripheral devices 50 and 52 jointly generate two decoy states, with average numbers of photons given by $v_1$ and $v_2$, respectively, which satisfy the conditions:

$$0 \leq v_2 < v_1$$

$$v_1 + v_2 < \mu$$

In this case, the first and second peripheral devices 50 and 52 can estimate the background lower limit $Y_0$, on the basis of:

$$v_1 Q_{v_2} e^{v_2} - v_2 Q_{v_1} e^{v_1} = v_1 \sum_{i=0}^{\infty} Y_i \frac{v_2^i}{i!} - v_2 \sum_{i=0}^{\infty} Y_i \frac{v_1^i}{i!} =$$

-continued $$(v_1 - v_2)Y_0 - v_1 v_2 \left( Y_2 \frac{v_1 - v_2}{2!} + Y_3 \frac{v_1^2 - v_2^2}{3!} + \ldots \right) \leq (v_1 - v_2)Y_0$$

Therefore, a lower limit of $Y_0$ is given by:

$$Y_0 \geq Y_0^L = \max\left\{ \frac{v_1 Q_{v_2} e^{v_2} - v_2 Q_{v_1} e^{v_1}}{(v_1 - v_2)}, 0 \right\}$$

where the equality sign holds for $v_2=0$, i.e. when one of the two decoy states is empty.

The multiple photon contribution (with a number of photons greater than or equal to two) in the signal state can be expressed in the form:

$$Q_\mu - Y_0 e^{-\mu} - Y_1 \mu e^{-\mu} = \sum_{i=2}^{\infty} Y_i \frac{\mu^i e^{-\mu}}{i!}$$

This gives:

$$Q_{v1} e^{v_1} - Q_{v2} e^{v_2} = (v_1 - v_2)Y_1 + \sum_{i=2}^{\infty} Y_i \frac{(v_1^i - v_2^i)}{i!}$$

$$\leq (v_1 - v_2)Y_1 + \frac{(v_1^2 - v_2^2)}{\mu^2} \sum_{i=2}^{\infty} Y_i \frac{\mu^i}{i!}$$

$$= (v_1 - v_2)Y_1 + \frac{(v_1^2 - v_2^2)}{\mu^2}(Q_\mu e^\mu - Y_0 - Y_1 \mu)$$

$$\leq (v_1 - v_2)Y_1 + \frac{(v_1^2 - v_2^2)}{\mu^2}(Q_\mu e^\mu - Y_0^L - Y_1 \mu)$$

where use has been made of the inequality $(a^i - b^i) \leq (a^2 - b^2)$ every time when $0 < a+b < 1$ and $i \geq 2$. The lower limit of gain $Y_1$ due to the single-photon state is given by:

$$Y_1 \geq Y_1^{L, v_1, v_2} =$$

$$\frac{\mu}{\mu v_1 - \mu v_2 - v_1^2 + v_2^2} = \left[ Q_{v1} e^{v_1} - Q_{v2} e^{v_2} - \frac{(v_1^2 - v_2^2)}{\mu^2}(Q_\mu e^\mu - Y_0^L) \right].$$

and the gain of the single-photon state has a lower limit given by:

$$Q_1 \geq Q_1^{L, v_1, v_2} = \mu e^{-\mu} Y_1^{L, v_1, v_2}$$

$$= \frac{\mu^2 e^{-\mu}}{\mu v_1 - \mu v_2 - v_1^2 + v_2^2}$$

$$\left[ Q_{v1} e^{v_1} - Q_{v2} e^{v_2} - \frac{(v_1^2 - v_2^2)}{\mu^2}(Q_\mu e^\mu - Y_0^L) \right]$$

The QBER of the decoy states is given by:

$$E_{v_1} Q_{v_1} e^{v_1} = e_0 Y_1 + e_1 v_1 Y_1 + \sum_{i=2}^{\infty} e_i Y_i \frac{v_1^i}{i!}$$

$$E_{v_2} Q_{v_2} e^{v_2} = e_0 Y_0 + e_1 v_2 Y_1 + \sum_{i=2}^{\infty} e_i Y_i \frac{v_2^i}{i!}$$

from which it is possible to obtain the upper limit of $e_1$, given by:

$$e_1 \leq e_1^{U, v_1, v_2} = \frac{E_{v_1} Q_{v_1} e^{v_1} - E_{v_2} Q_{v_2} e^{v_2}}{(v_1 - v_2) Y_1^{L, v_1, v_2}}$$

In the case where $v_1$ and $v_2$ tend to zero, the following are obtained:

$$Y_1^{L, 0} = Y_0 + \eta$$

$$e_1^{U, 0} = \frac{e_0 Y_0 + e_{detector} \eta}{Y_1},$$

these being the previously calculated theoretical values. The relative deviation from the theoretical value of $Y_1$ is given by:

$$\beta_{Y_1} = \frac{Y_1^{L, 0} - Y_1^{L, v_1, v_2}}{Y_1^{L, 0}}$$

While the relative deviation of $e_1$ is given by:

$$\beta_{e_1} = \frac{e_1^{U, v_1, v_2} - e_1^{U, 0}}{e_1^{U, 0}}$$

For practical purposes, the performance of the cryptographic system 49 can be appreciated by observing that the state present on the first and second ports of the first beam splitter 80 is, as previously specified, equal to:

$$|\alpha e^{-2a(L_A + L_B)} e^{-(v_{A1} + v_{B2})}(e^{i\phi_B} - e^{i\phi_A})/2\rangle_1 \otimes |\alpha e^{-2a(L_A + L_B)} e^{-(v_{A1} + v_{B2})}(e^{i\phi_B} + e^{i\phi_A})/2\rangle_2$$

and can be rewritten as:

$$\left| \frac{\alpha_{Bob}}{\sqrt{2}} e^{-a L_B}(e^{i\varphi_B} - e^{i\varphi_A}) \right\rangle_1 \otimes \left| \frac{\alpha_{Bob}}{\sqrt{2}} e^{-a L_B}(e^{i\varphi_B} + e^{i\varphi_A}) \right\rangle_2$$

where:

$$\alpha_{Bob} = \frac{\alpha}{\sqrt{2}} e^{-a(2L_A + L_B)} e^{-(v_A + v_B)}$$

In other words, it is as if the second peripheral device 52 had a source with an average number of photons given by:

$$\mu_{Bob} = |\alpha_{Bob}|^2 = \frac{|\alpha|^2}{2} e^{-2a(L_A+L_B)} e^{-2(v_A+v_B)}$$

and the first peripheral device 50 had a source with an average number of photons given by:

$$\mu_{Alice} = \frac{|\alpha|^2}{2} e^{-2a(L_A+L_B)} e^{-2(v_A+v_B)} = \mu_{Bob} e^{2a(L_A-L_B)}$$

Considering a useful measurement, i.e. referring to the case in which the first and second peripheral devices 50 and 52 select phase values belonging to the same base and equal to each other, the density matrix is given by:

$$\rho_{AB} = \sum_{i=0}^{\infty} \frac{2\mu_{Bob} e^{-2\mu_{Bob}}}{i!} |i\rangle\langle i|$$

where the transmittance $t_{Ch}$ of the channel is expressed by:

$$t_{Ch} = e^{-2aL_B} = 10^{-\frac{A}{10}L_B}$$

The optimal choice of $\mu_{Bob}$ is therefore given by:

$$\mu_{Bob} = \frac{\mu_{opt}}{2}$$

in the case where the length $L_B$ of the second fibre optic span 92 is greater than the length $L_A$ of the first fibre optic span 90; in this case, the source of the first peripheral device 50 has an average number of photons equal to:

$$\mu_{Alice} = \frac{\mu_{opt}}{2} 10^{-\frac{A}{10}(L_B-L_A)} \leq \mu_{Bob}$$

The following relation also holds:

$$\mu_{Alice} + \mu_{Bob} \leq \mu_{opt}$$

It should be noted that the equality sign holds when $L_B = L_A$, i.e. when the central device 54 is halfway between the first and second peripheral devices 50 and 52. In this case, under the same conditions, the maximum distance between the first and second peripheral devices 50 and 52 reaches that of a QKD system based on entangled states; in addition, the central device 54 functions as a quantum repeater.

The foregoing considerations regarding the relation between $\mu_{Alice}$ and $\mu_{Bob}$ are also applied to the pair $v_{Alice1}$ and $v_{Bob1}$ and to the pair $v_{Alice2}$ and $v_{Bob2}$, which indicate the average numbers of photons emitted by the first and second peripheral devices 50 and 52 when the first and second decoy states are respectively generated.

Figure 9:
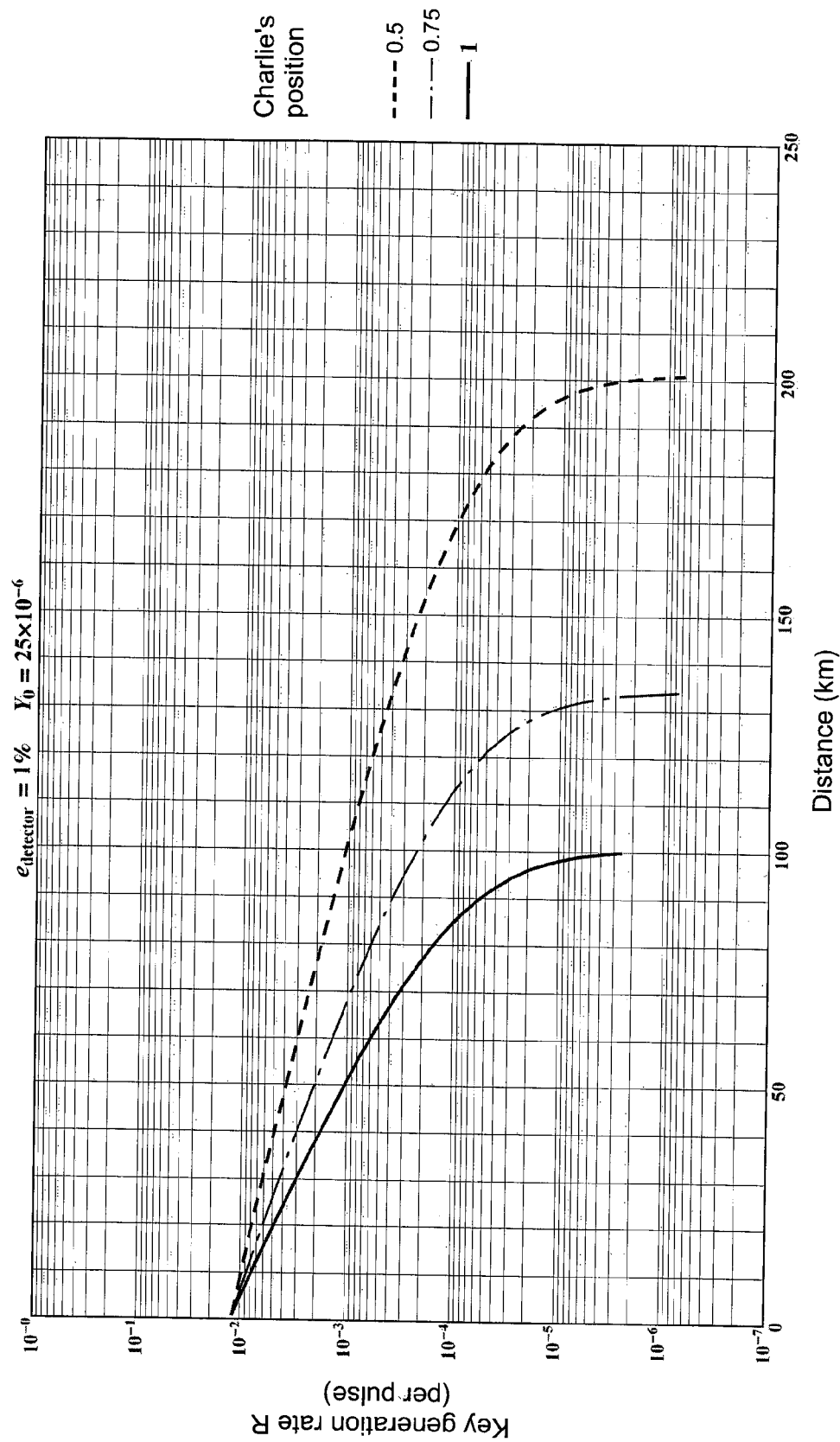
FIGS. 9-12 show trends of characteristic quantities of the system shown in FIG. 5.

From a quantitative viewpoint, FIG. 9 shows an example of the trends in key generation rate R (per pulse), as a function of the position of the central device 54 with respect to the optical link between the first and second peripheral devices 50 and 52. In this case, $e_{detector}=1\%$ and $Y_0=25*10^{-6}$ is assumed; furthermore, the position of the central device 54 is indicated by means of a parameter having values of 1 and 0.5, respectively when the position of the central device 54 coincides with the position of the first peripheral device 50 and when the central device 54 is placed halfway between the first and second peripheral devices 50 and 52.

Figure 10:
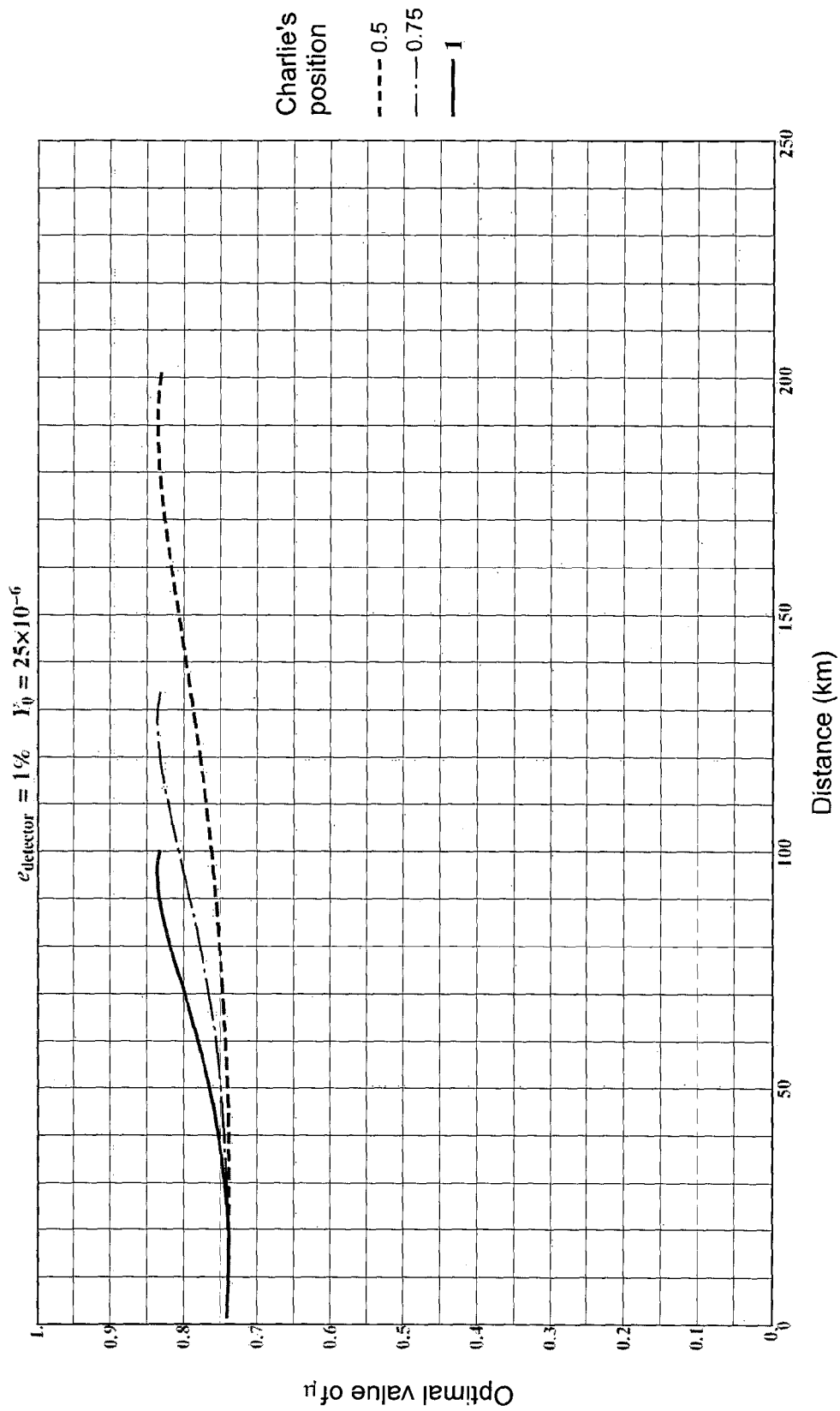

Instead, FIG. 10 shows the trend of the optimal value of $\mu$ as the distance (intended as $L_A+L_B$) varies and for the same assumptions specified for FIG. 9.

Figure 11:
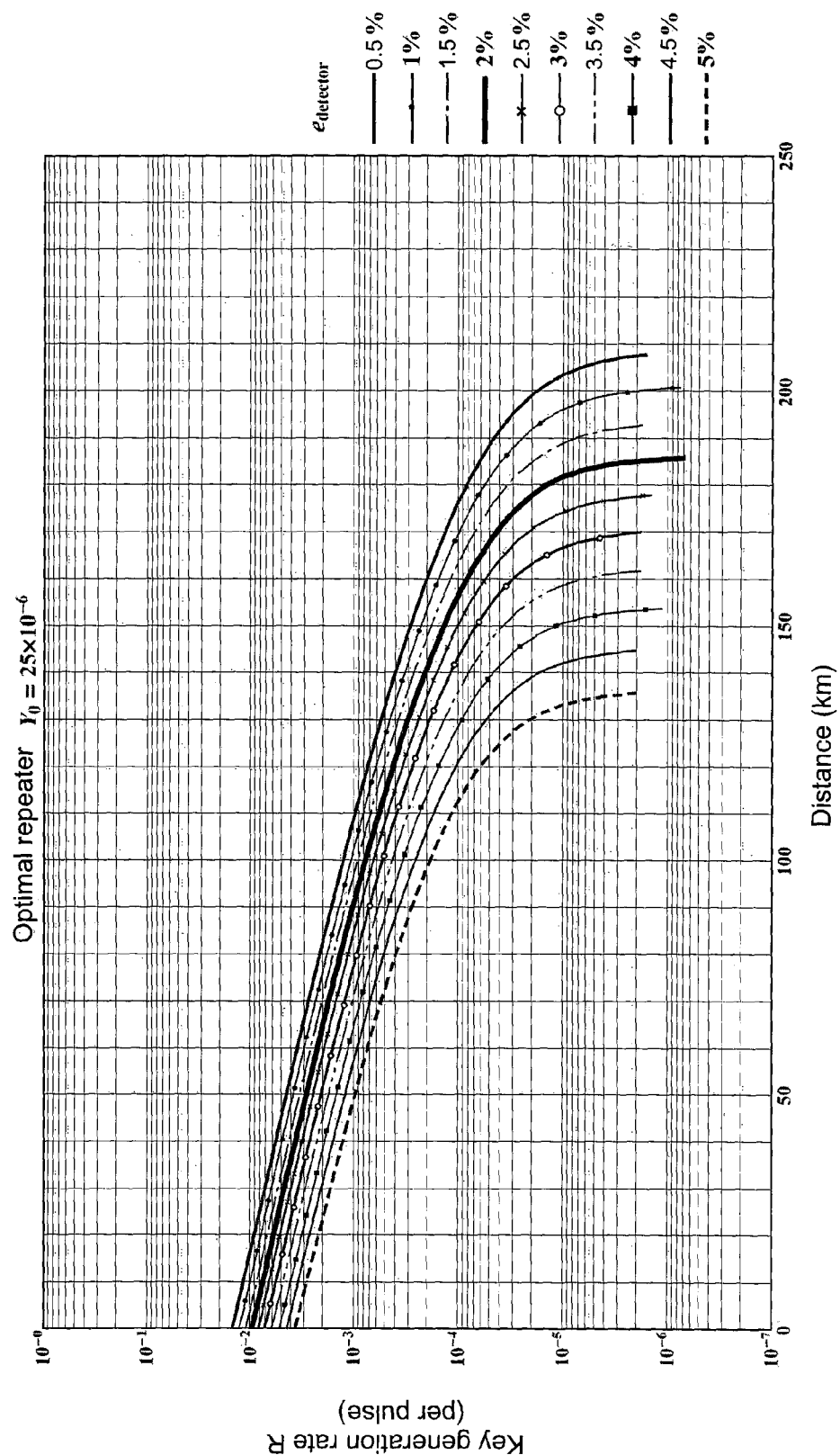

FIG. 11 shows an example of the trend of the key generation rate R (per pulse), as a function of the above-mentioned distance, assuming $Y_0=25*10^{-6}$ and having the central device 54 located halfway between the first and second peripheral devices 50 and 52.

Figure 12:
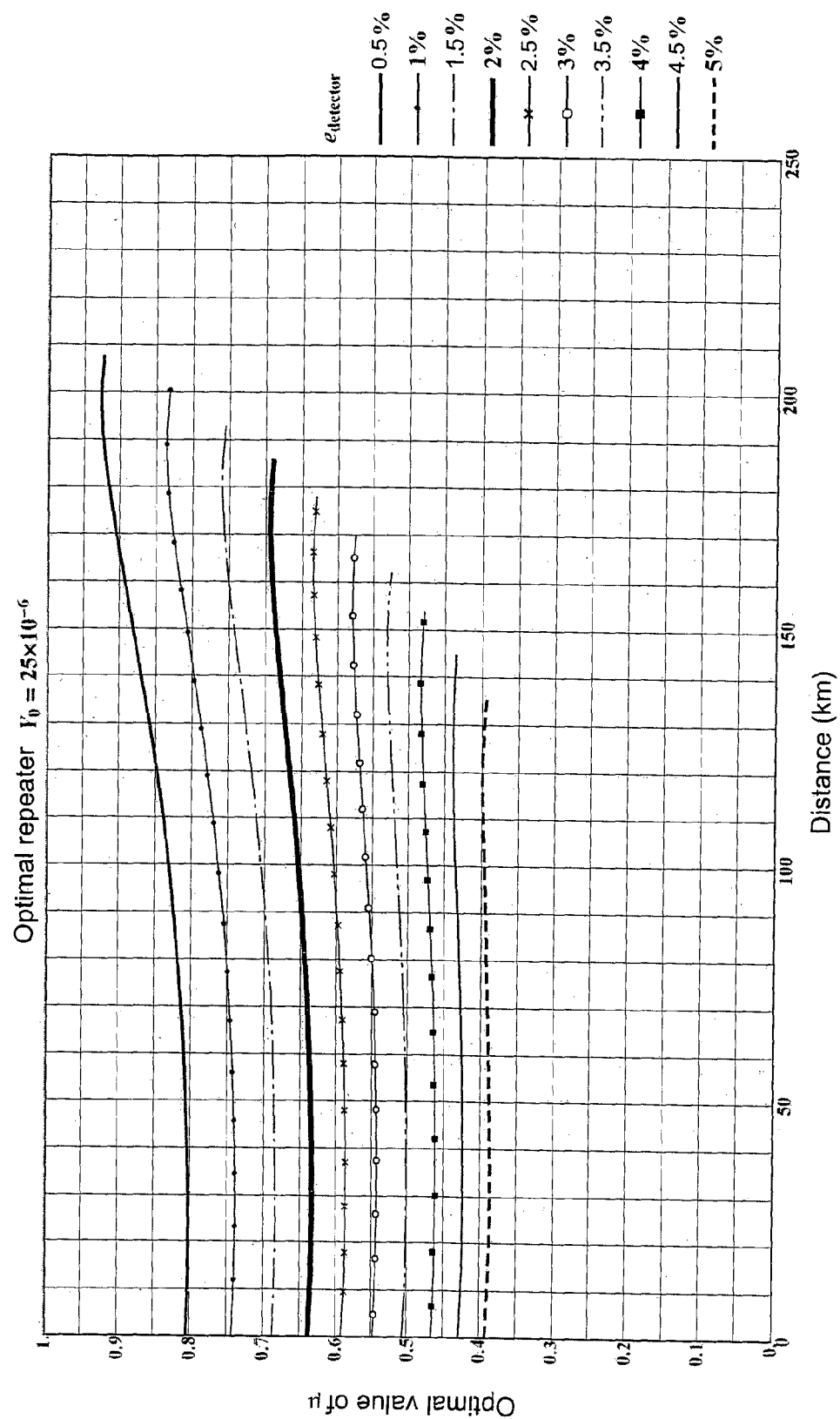

Finally, FIG. 12 shows the trend of the optimal value of p as the above-mentioned distance varies, assuming $Y_0=25*10^{-6}$ and having the central device 54 located halfway between the first and second peripheral devices 50 and 52.

The advantages that can be obtained with the present cryptographic system clearly emerge from the foregoing description. In fact, the present cryptographic system implements an interferometric scheme that, starting from an optical pulse, allows generating a first and a second optical sub-pulse, which, before interfering, traverse a same optical path in opposite directions. In this way, temporal alignment is guaranteed as well as high phase stability. Furthermore, unlike known types of cryptographic systems, the central device 54 also has the optical source 62, in addition to the optical detectors; in any case, this does not imply that the central device 54 has control of the optical source 62, as the first and second peripheral devices 50 and 52 can, by means of the first and second variable optical splitters 94 and 114, attenuate the optical sub-pulses to the desired level, as well as monitor power fluctuations caused by the central device 54.

Finally, it is clear that modifications and variants may be made to the present cryptographic system without departing from the scope of the present invention, as defined in the appended claims.

For example, the first and second fibre optic spans 90 and 92 may not be polarization maintaining, as also: the optical links between the circulator 66 and i) the optical source, ii) the first optical detection unit 70 and iii) the first optical beam splitter 80; the optical link between the first optical beam splitter 80 and the second optical detection unit 72; the optical paths inside the first and second peripheral devices 50 and 52.

Furthermore, in addition to the central device 54 that acts as a server, the system can comprise a number of peripheral terminals greater than two. In this case, it is possible, for example, to insert an electronically controllable type of optical switch between the third optical beam splitter 84, on one side, and a plurality of peripheral devices on the other, which include the second peripheral device 52. Furthermore, each one of the devices of the above-mentioned plurality of peripheral devices is connected to the optical switch by means of a corresponding fibre optic span. In this way, the central device 54 is optically connected to the first peripheral device 50 and to any of the peripheral devices connected to the optical switch.

Finally, embodiments are possible in which the phase encoding of the first and second optical sub-pulses takes place by using a number of systems of bases greater than two and/or a number of systems of bases formed by different angles and/or by a number of angles greater than two.

The invention claimed is:

1. A quantum cryptographic key distribution system comprising:
an optical source configured to generate a plurality of optical pulses;
a first optical beam splitter having a first, a second, a third and a fourth port and configured to generate, starting from each optical pulse, a first and a second optical sub-pulse, respectively on the third and fourth ports;
a first and a second peripheral devices; and
an optical path that optically couples the first and second peripheral devices to each other through the first optical beam splitter, said optical path having a first and a second end which are respectively connected to the third and fourth ports of the first optical beam splitter, said optical path extending through the first and second peripheral devices and also being configured to be traversed in a first and a second direction between the first and second peripheral devices through the first optical beam splitter, respectively by the first and second optical sub-pulses, said first and second directions being opposite to one another, so that the first and second optical sub-pulses respectively impinge on the fourth and third ports of the first optical beam splitter through the optical path;
wherein the first peripheral device is configured to randomly phase shift the second optical sub-pulse by a first phase, and the second peripheral device is configured to randomly phase shift the first optical sub-pulse by a second phase; and wherein, in use, the first and second optical sub-pulses impinge concurrently on the first optical beam splitter, thereby causing interference in the first optical beam splitter between the first and second optical sub-pulses, said interference generating an optical signal in a deterministic manner on the first or the second port of the first optical beam splitter, or in an non-deterministic manner, as a function of a relation between the first and second phases; and wherein each of the first and second peripheral devices is configured to generate a cryptographic key on the basis of whether said optical signal, when generated in a deterministic manner, is generated on the first or the second port of the first optical beam splitter.

2. The system according to claim 1, wherein the first peripheral device is configured to select the first phase from among the angles of at least a first and a second system of bases, and the second peripheral device is configured to select the second phase from among the angles of said at least a first and a second system of bases; and wherein, in use, if the first and second phases are equal to angles belonging to a same system of bases, the interference generates said optical signal in a deterministic manner on the first or the second port of the first optical beam splitter, as a function of the relation between the first and second phases.

3. The system according to claim 2, comprising a central device, including the first optical beam splitter and a first and a second optical detection unit optically connected, respectively, to the first and second ports of the first optical beam splitter; wherein the central device is configured to communicate the detections of the first and second optical detection units to the first and second peripheral devices; and wherein the first system of bases is formed by a respective plurality of angles and the second system of bases is formed by a respective plurality of angles; and wherein each of the first and second peripheral devices is configured to:
randomly select a system of bases from among said at least a first and a second system of bases;
randomly select one of the angles from among the angles of the plurality of angles of the selected system of bases;
communicate the selected system of bases to the other peripheral device; and
generate said cryptographic key, on the basis of the detections of the first and second optical detection units and the systems of bases selected by said peripheral device and by the other peripheral device.

4. The system according to claim 2, wherein in use the first and second optical sub-pulses impinge on the fourth and third ports of the first optical beam splitter with a same polarization.

5. The system according to claim 4, wherein the optical path comprises a second and a third optical beam splitter, each of which is of polarizing type and has a first, a second and a third port; and wherein the first, second and third ports of the second optical beam splitter are respectively connected to the third port of the first optical beam splitter, the first peripheral device and the third port of the third optical beam splitter, the first and second ports of the third optical beam splitter being respectively connected to the fourth port of the first optical beam splitter and the second peripheral device.

6. The system according to claim 5, wherein each of the first and second peripheral devices comprises a respective reflective element configured to reflect the first and second optical sub-pulses, inverting the polarization of the first and second optical sub-pulses.

7. The system according to claim 1, wherein, during propagation along the optical path, the first optical sub-pulse passes first through the first peripheral device and then the second peripheral device, and the second optical sub-pulse passes first through the second peripheral device and then the first peripheral device.

8. The system according to claim 1, wherein each of the first and second peripheral devices comprises respective detectors configured to detect the power of the first and second optical sub-pulses.

9. The system according to claim 1, wherein each of the first and second peripheral devices is configured to operate in a first operating mode; and wherein, when the first and second peripheral devices both operate in the first operating mode, the first and second optical sub-pulses undergo a same attenuation along the optical path.

10. The system according to claim 9, wherein, when the first and second peripheral devices both operate in the first operating mode, the first and second sub-pulses jointly form, when they impinge on the first optical beam splitter, an optical state having an average number of photons not exceeding one.

11. The system according to claim 10, further comprising a first fibre-optic span, which connects the first peripheral device to the first optical beam splitter, and a second fibre-optic span, which connects the second peripheral device to the first optical beam splitter; and wherein, when the first and second peripheral devices both operate in the first operating mode, the first sub-pulse departs from the second peripheral device with an average number of photons $\mu_{Bob}$ and the second sub-pulse departs from the first peripheral device with an average number of photons $\mu_{Alice}$, the ratio $\mu_{Alice}/\mu_{Bob}$ being a function of the difference between the lengths of the first and second fibre-optic spans.

12. The system according to claim 9, wherein each of the first and second peripheral devices is configured to randomly switch between the first operating mode and at least a second operating mode; and wherein, when operating in the second operating mode, the first and second peripheral devices respectively attenuate the second and first optical sub-pulses to a greater extent with respect to the first operating mode.

13. A cryptographic key distribution method, comprising the steps of:
    generating a plurality of optical pulses;
    generating a first and a second optical sub-pulse, starting from each optical pulse and by means of a first optical beam splitter having a first, a second, a third and a fourth port, the first and second optical sub-pulses being respectively generated on the third and fourth ports;
    causing propagation of the first and second optical sub-pulses through an optical path that optically couples the first and second peripheral devices to each other through the first optical beam splitter, said optical path having a first and a second end which are respectively connected to the third and fourth ports of the first optical beam splitter and extending through a first and a second peripheral device, said step of causing propagation being such that the first and second optical sub-pulses respectively propagate along the optical path in a first and a second direction between the first and second peripheral devices through the first optical beam splitter, said first and second directions being opposite to one another, so that the first and second optical sub-pulses respectively impinge on the fourth and third ports of the first optical beam splitter;
    randomly phase shifting the second optical sub-pulse by a first phase;
    randomly phase shifting the first optical sub-pulse by a second phase;
    causing the first and second optical sub-pulses to impinge concurrently on the first optical beam splitter, thereby causing interference in the first optical beam splitter between the first and second optical sub-pulses, said interference generating an optical signal in a deterministic manner on the first or the second port of the first optical beam splitter, or in an non-deterministic manner, as a function of a relation between the first and second phases; and
    generating a cryptographic key on the basis of whether said optical signal, when generated in a deterministic manner, is generated on the first or the second port of the first optical beam splitter.

14. The method according to claim 13, wherein said step of phase shifting the second optical sub-pulse comprises selecting the first phase from among the angles of at least a first and a second system of bases; and wherein said step of phase shifting the first optical sub-pulse comprises selecting the second phase from among the angles of said at least a first and a second system of bases; and wherein, if the first and second phases are equal to angles belonging to a same system of bases, the interference generates said optical signal in a deterministic manner on the first or the second port of the first optical beam splitter, as a function of the relation between the first and second phases.

15. The method according to claim 13, wherein, during propagation along the optical path, the first optical sub-pulse passes first through the first peripheral device and then the second peripheral device, and the second optical sub-pulse passes first through the second peripheral device and then the first peripheral device.

16. The method according to claim 13, further comprising:
    a first step of attenuating the second optical sub-pulse by the first peripheral device; and
    a second step of attenuating the first optical sub-pulse by the second peripheral device;
and wherein the first and second optical sub-pulses undergo a same attenuation along the optical path.

17. The method according to claim 16, wherein the first and second sub-pulses jointly form, when they impinge on the first optical beam splitter, an optical state having an average number of photons not exceeding one.

18. The method according to claim 16, further comprising:
    a third step of attenuating the second optical sub-pulse by the first peripheral device, said third step of attenuating comprising greater attenuation of the second optical sub-pulse with respect to the first step of attenuating; and
    a fourth step of attenuating the first optical sub-pulse by the second peripheral device, said fourth step of attenuating comprising greater attenuation of the first optical sub-pulse with respect to the second step of attenuating;
said method further comprising the steps of:
    randomly switching between the first and third steps of attenuating; and
    randomly switching between the second and fourth steps of attenuating.

* * * * *